(12) United States Patent
Iwamoto et al.

(10) Patent No.: US 6,664,952 B2
(45) Date of Patent: Dec. 16, 2003

(54) OPTICAL SCANNING-TYPE TOUCH PANEL

(75) Inventors: Yasuhide Iwamoto, Kawasaki (JP);
Satoshi Sano, Kawasaki (JP);
Fumihiko Nakazawa, Kawasaki (JP);
Nobuyasu Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 84 days.

(21) Appl. No.: 09/843,907

(22) Filed: Apr. 30, 2001

(65) Prior Publication Data

US 2001/0028344 A1 Oct. 11, 2001

Related U.S. Application Data

(63) Continuation of application No. PCT/JP99/06069, filed on Oct. 29, 1999.

(30) Foreign Application Priority Data

Nov. 20, 1998 (JP) ............................................ 10-331738

(51) Int. Cl.[7] .................................................. G09G 5/00
(52) U.S. Cl. ..................... 345/175; 178/18.09; 250/221
(58) Field of Search ................................ 345/175, 173, 345/156, 157, 179; 178/18.01, 18.09, 18.03; 250/221, 231.1

(56) References Cited

U.S. PATENT DOCUMENTS

| 4,811,004 A | * | 3/1989 | Person et al. ............... 250/221 |
| 4,826,271 A | | 5/1989 | Takahashi et al. |
| 5,248,856 A | * | 9/1993 | Mallicoat ................. 178/18.09 |

FOREIGN PATENT DOCUMENTS

| EP | 0 600 576 A1 | 6/1994 |
| JP | 57-211637 | 12/1982 |
| JP | 61-59413 | 3/1986 |
| JP | 62-5428 | 1/1987 |
| JP | 64-18823 | 1/1989 |
| JP | 4-223424 | 8/1992 |
| JP | 4-247420 | 9/1992 |
| JP | 6-43383 | 2/1994 |
| JP | 6-148552 | 5/1994 |
| JP | 7-98437 | 4/1995 |
| JP | 8-122687 | 5/1996 |
| JP | 9-146026 | 6/1997 |
| JP | 11-85399 | 3/1999 |

* cited by examiner

*Primary Examiner*—Dennis-Doon Chow
(74) *Attorney, Agent, or Firm*—Armstrong, Kratz, Quintos, Hanson & Brooks, LLP

(57) ABSTRACT

An optical unit of an optical scanning-type touch panel is constructed by providing a light emitting element for emitting infrared laser light, a collimation lens for changing the laser light from the light emitting element into parallel light, a light receiving element for receiving scanning light, a slit plate for limiting incident light on the light receiving element, a polygon mirror for angularly scanning the laser light from the light emitting element, an aperture mirror for limiting light projected onto the polygon mirror from the collimation lens by an aperture and for reflecting the reflected light from the polygon mirror toward the light receiving element, a light receiving lens for focusing the reflected light from the aperture mirror, and a motor for rotating the polygon mirror in a single optical unit main body as one unit.

33 Claims, 37 Drawing Sheets

15

15

FIG. 12
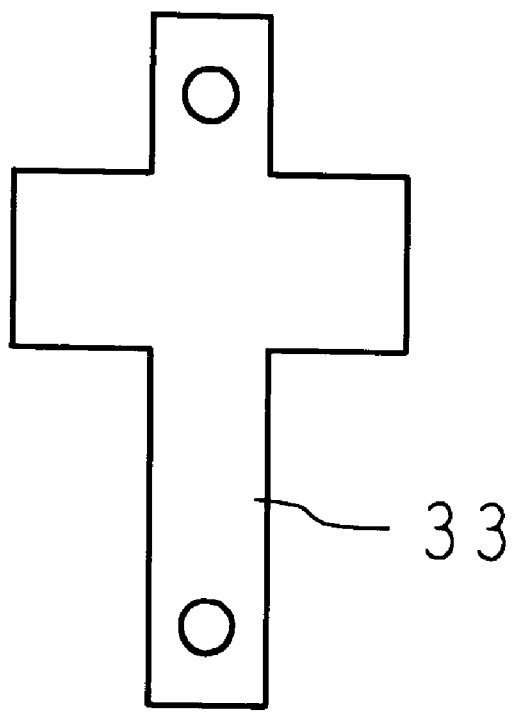
33
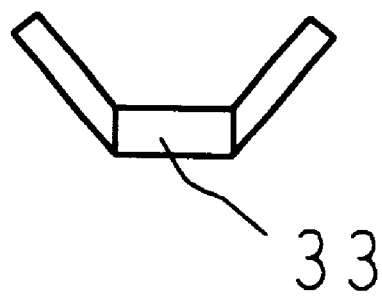
33

FIG. 14
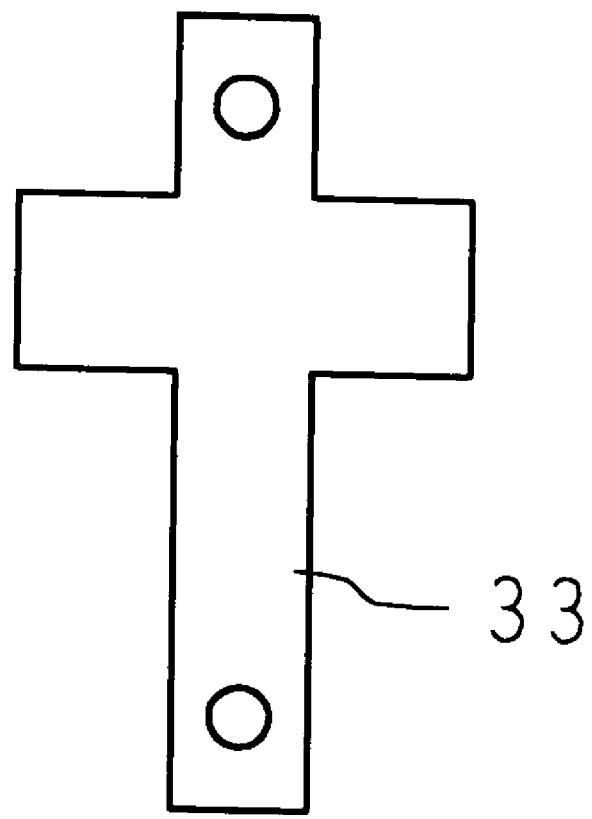

g : LENGTH FROM REFERENCE SURFACE OF LIGHT EMITTING ELEMENT TO BOTTOM SURFACE THEREOF

F I G. 3 0
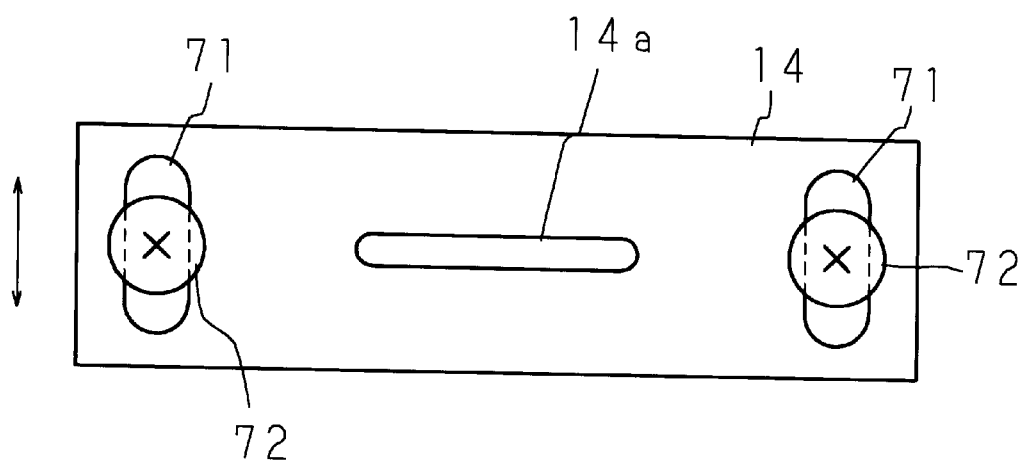

OPTICAL SCANNING-TYPE TOUCH PANEL

This application is a continuation of international application PCT/JP99/06069 filed Oct. 29, 1999.

TECHNICAL FIELD

The present invention relates to an optical scanning-type touch panel for optically detecting the position of an indicator on a display screen of a display device on which information is displayed by a computer system, etc.

BACKGROUND ART

With the spread of computer systems, mainly personal computers, there has been used a device for inputting new information or giving various instructions to a computer system by pointing at a position on a display screen of a display device on which information is displayed by the computer system, with a person's finger or a specific indicator.

In order to perform an input operation with respect to the information displayed on such a display screen of the display device of a personal computer or the like by a touching method, it is necessary to detect a touched position (indicated position) on the display screen with high accuracy. As an example of such a method of detecting the indicated position on the display screen serving as a coordinate surface, Japanese Patent Application Laid-Open No. 57-211637/1982 discloses an optical position detecting method. According to this method, focused light such as a laser beam is scanned angularly from the outside of the display screen, an angle of a position where a special pen is present is calculated from each of two timings of reflected light from the special pen having reflecting means, and the calculated angles are applied to the triangulation principle to detect the coordinate of the position by calculation. This method can reduce the number of parts significantly, and can provide high resolution. However, there are problems in the operability, for example, that a special reflecting pen must be used, and the position of a finger, an arbitrary pen or the like is not detectable.

Another optical position detecting method is suggested in Japanese Patent Application Laid-Open No. 62-5428/1987. According to this method, a light retro-reflector is positioned on a frame on both sides of the display screen, return light of an angularly scanned laser beam from the light retro-reflector is detected, an angle of a position where a finger or pen exists is calculated from a timing that the light beam is cut off by the finger or pen, and the coordinate of the position is detected from the calculated angle according to the triangulation principle. In this method, the accuracy of detection can be maintained with a small number of parts, and the position of the finger, arbitrary pen or the like is detectable.

In such an optical scanning-type touch panel in which light is angularly scanned, the accuracy of detection of the position of the indicator largely depends on the accuracy of the optical axis of a light emitting element, light receiving element, lens, angular-scanning means (polygon mirror), etc, i.e., the preciseness of verticality and parallelism of these optical members. In particular, in this optical scanning-type touch panel, unlike optical scanning-type printers utilizing scanning light in a similar manner, since the probability that the scanning light comes into contact with the human body is high, the intensity of light to be used is not increased much if the influence of the scanning light on the human body is taken into consideration; and since there is a limitation that the influence of attenuation is large because the optical path of the scanning light is longer compared with that the optical scanning-type printers, a particularly high optical axis accuracy is required. However, it was hard to say that conventional optical scanning-type touch panels as mentioned above were designed by sufficiently taking the optical axis accuracy into consideration.

The present invention was invented in view of such a circumstance, and an object of the present invention is to provide an optical scanning-type touch panel capable of improving the optical axis accuracy and optically detecting a position with accuracy.

DISCLOSURE OF THE INVENTION

An optical scanning-type touch panel of the present invention is an optical scanning-type touch panel comprising: an optical scanner for angularly scanning light in a plane substantially parallel to a predetermined region; and an optical transceiver for projecting light onto the optical scanner and receiving part of scanning light of the optical scanner, for measuring a scanning light cut-off position, which is produced in the predetermined region by an indicator, based on a light receiving output of the optical transceiver that corresponds to a scanning angle, wherein the optical scanner and the optical transceiver are mounted on a single base body.

Another optical scanning-type touch panel of the present invention is an optical scanning-type touch panel comprising: an optical scanner for angularly scanning light in a plane substantially parallel to a predetermined region; and an optical transceiver for projecting light onto the optical scanner and receiving part of scanning light of the optical scanner, for measuring a scanning light cut-off position, which is produced in the predetermined region by an indicator, based on a light receiving output of the optical transceiver that corresponds to a scanning angle, wherein the optical scanner comprises a polygon mirror and a motor for rotating the polygon mirror, the optical transceiver comprises a light emitting element, a collimation lens for changing light from the light emitting element into parallel light, a light receiving element for receiving part of scanning light, an aperture mirror for limiting the parallel light from the collimation lens and reflecting part of the scanning light toward the light receiving element, a light receiving lens for focusing reflected light from the aperture mirror on the light receiving element and a slit plate for limiting focused light from the light receiving lens, and the polygon mirror, motor, light emitting element, collimation lens, light receiving element, aperture mirror, light receiving lens and slit plate are mounted on a single base body as one unit.

In the optical-scanning-type touch panels of the present invention, since the optical transceiver and the optical scanner are provided on a single base body as one unit, it is possible to accurately regulate the optical axis. Accordingly, highly accurate position detection results are obtained.

BRIEF DESCRIPTION OF THE DRAWINGS

FIG. 12 is an illustration showing one example of the shape of a plate spring; FIG. 14 is an illustration showing still another example of the shape of a plate spring; FIG. 30 is an illustration showing an example of the structure of a slit plate.

BEST MODE FOR IMPLEMENTING THE INVENTION

Figure 1:
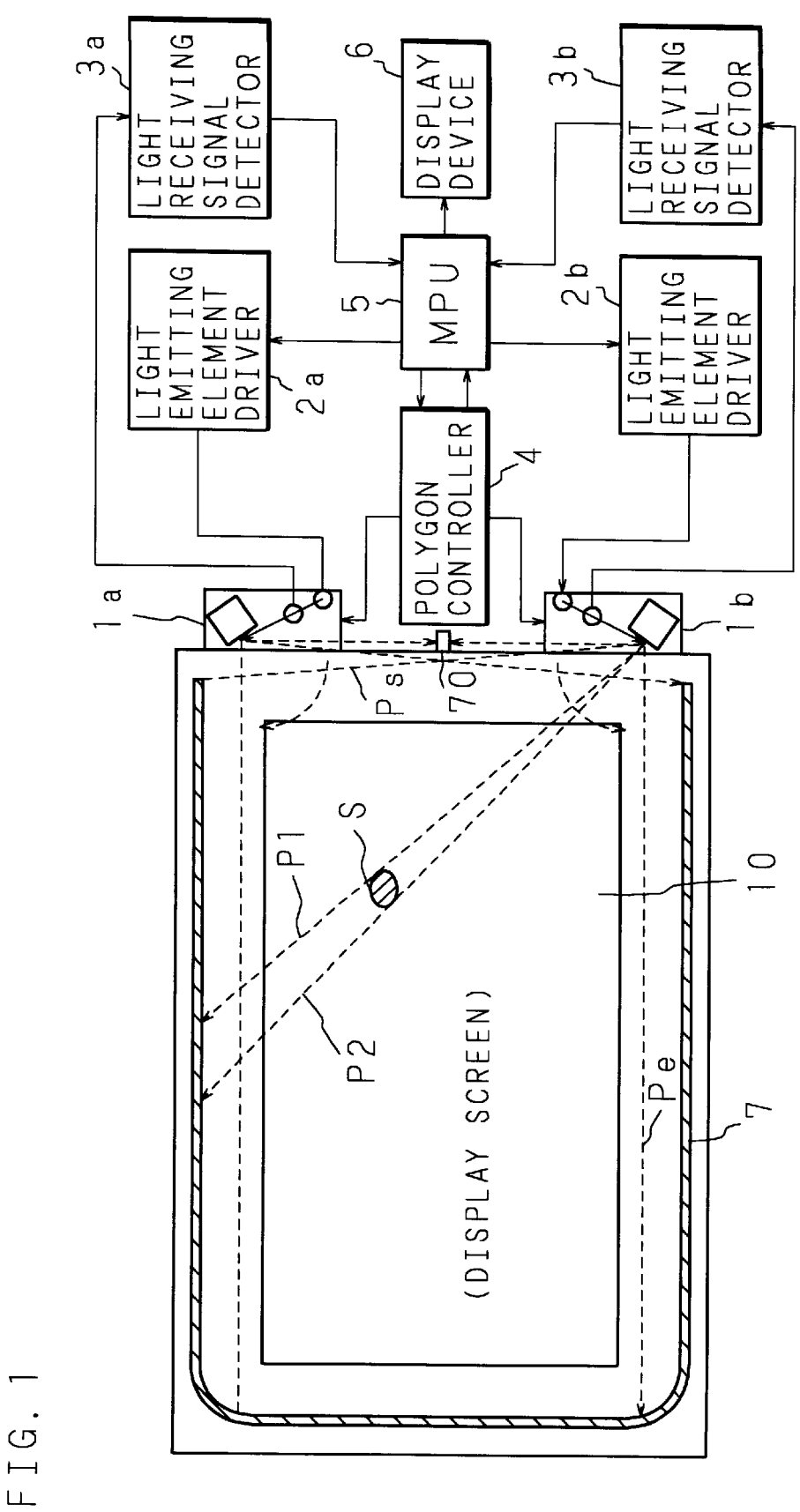
FIG. 1 is a schematic diagram showing the basic structure of an optical scanning-type touch panel of the present invention.

The following description will describe the present invention in detail with reference to the drawings illustrating an embodiment thereof. FIG. 1 is a schematic diagram showing the basic structure of an optical scanning-type touch panel of the present invention.

In FIG. 1, reference numeral 10 is a display screen of a CRT, flat display panel (PDP, LCD, EL, etc.) or projection-type image display device of electronic equipment such as a personal computer, and the optical scanning-type touch panel of this embodiment is constructed as the display screen of a PDP (Plasma Display Panel) having display dimensions of 92.0 cm in a horizontal direction×51.8 cm in a vertical direction and 105.6 cm diagonal.

Optical units 1a and 1b having therein an optical system composed of a light emitting element, a light receiving element, a polygon mirror and various lenses are respectively provided on the outside of both corners of one short side (the right side in this embodiment) of a rectangular display screen 10 that is the extent of a plane specified as a target area to be touched by an indicator (blocking object) S such as a finger and a pen. Moreover, a recurrence reflection sheet 7 is provided on the outside of three sides other than the right side of the display screen 10, namely, the upper, lower and left sides.

Further, reference numeral 70 is a light shielding member. This light shielding member 70 is disposed on a line connecting both the optical units 1a and 1b so that direct light does not enter between the optical units 1a and 1b, more specifically light projected from the optical unit 1a does not enter the optical unit 1b and light projected from the optical unit 1b does not enter the optical unit 1a. Besides, the light shielding member 70 is an object whose light reflectance is "0" practically, and its height is substantially the same as the height of the recurrence reflection sheet 7.

Figure 2:
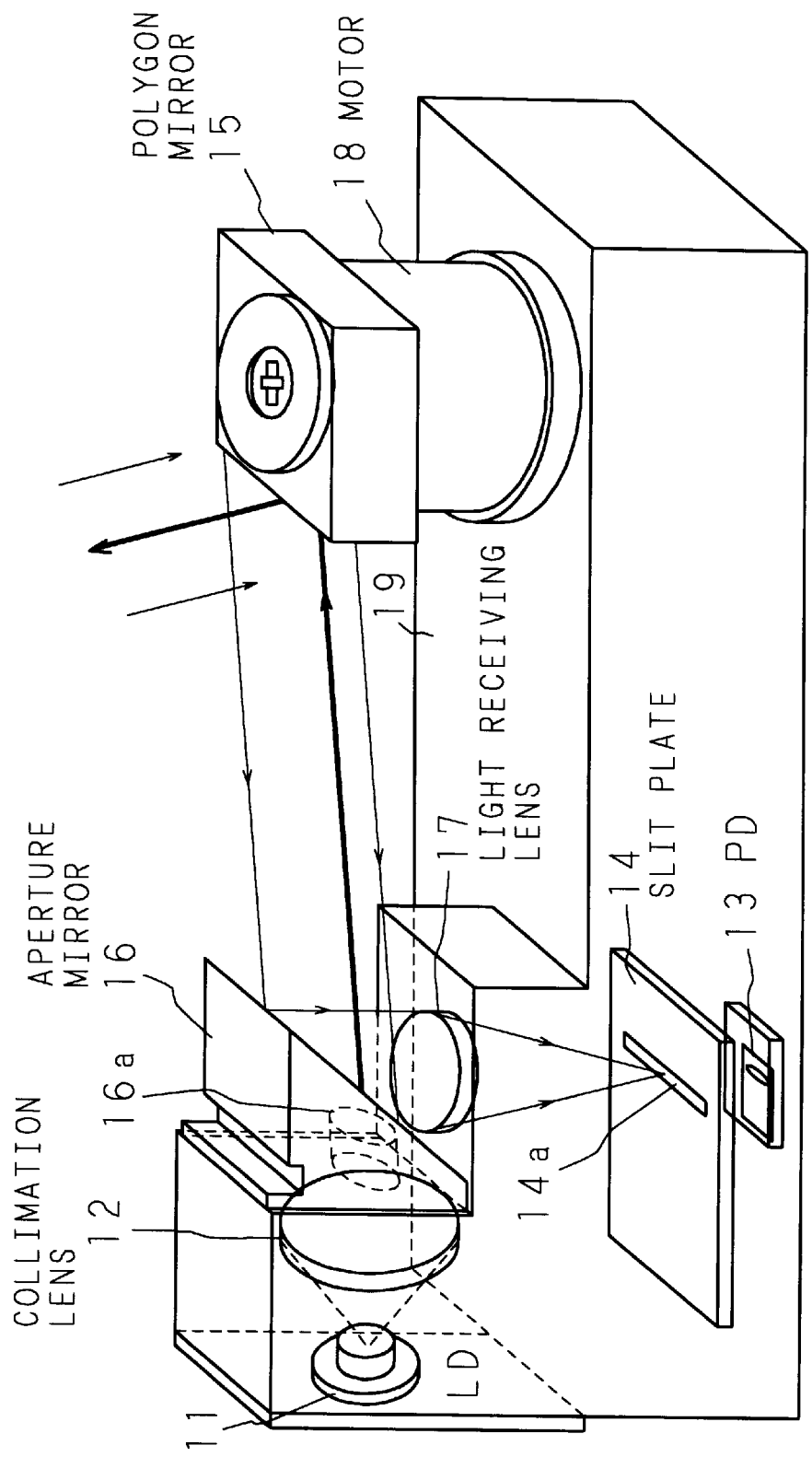
FIG. 2 is an illustration showing the structure of an optical unit and optical path.

FIG. 2 is an illustration showing the structure of the optical units 1a and 1b and the optical path. Both the optical units 1a and 1b have the same internal structure. The optical unit 1a (1b) includes a light emitting element 11 composed of a laser diode (LD) for emitting infrared laser light; a collimation lens 12 for changing the laser light from the light emitting element 11 into parallel light; a light receiving element 13 composed of a photodiode (PD) for receiving reflected light from the recurrence reflection sheet 7; a slit plate 14 having a slit 14a for limiting incident light on the light receiving element 13; a polygon mirror 15 having the shape of a square column, for example, for angularly scanning the laser light from the light emitting element 11; an aperture mirror 16 for limiting light projected onto the polygon mirror 15 from the collimation lens 12 by an aperture 16a and for reflecting light reflected from the recurrence reflection sheet 7 through the polygon mirror 15 toward the light receiving element 13; a light receiving lens 17 for focusing light reflected from the aperture mirror 16 on the light receiving element 11; a motor 18 for rotating the polygon mirror 15; and an optical unit main body 19 (see FIG. 3) on which these members are mounted and fixed.

The above-mentioned light emitting element 11, collimation lens 12 and aperture mirror 16 constitute a light emitting system; the aperture mirror 16, light receiving lens 17, slit plate 14 and light receiving element 13 constitute a light receiving system; and these light emitting system and light receiving system constitute an optical transceiver. Besides, the above-mentioned polygon mirror 15 and motor 18 constitute an optical scanner. The optical unit main body 19 is provided with three motor fixing holes 19a for fixing this optical scanner (motor 18).

The laser light emitted from the light emitting element 11 is changed into parallel light by the collimation lens 12, passes through the aperture 16a of the aperture mirror 16, is angularly scanned in a plane which is substantially parallel with the display screen 10 by a rotation of the polygon mirror 15 and projected onto the recurrence reflection sheet 7. After the reflected light from the recurrence reflection sheet 7 is reflected by the polygon mirror 15 and the aperture mirror 16, the reflected light is focused by the light receiving lens 17 to pass through the slit 14a of the slit plate 14 and enter the light receiving element 13. However, if the indicator S is present on the optical path of the projected light, the projected light is cut off, and therefore the reflected light does not enter the light receiving element 13.

The optical units 1a and 1b are connected with light emitting element drivers 2a and 2b for driving the respective light emitting elements 11, light receiving signal detectors 3a and 3b for converting an amount of light received by the respective light receiving elements 13 into an electric signal, and a polygon controller 4 for controlling the operation of the respective polygon mirrors 15. Moreover, reference numeral 5 represents an MPU for calculating the position and size of the indicator S and for controlling the operation of the entire apparatus, and 6 represents a display device for displaying the results of the calculations performed by the MPU 5.

The MPU 5 transmits drive control signals to the light emitting element drivers 2a and 2b, so that the light emitting element drivers 2a and 2b are driven according to the drive control signals and the light emitting operation of the respective light emitting elements 11 is controlled. The light receiving signal detectors 3a and 3b transmit the light receiving signals of the reflected light of the respective light receiving elements 13 to the MPU 5. The MPU 5 calculates the position and size of the indicator S based on the light receiving signals from the respective light receiving elements 13, and displays the results of the calculations on the display device 6. Here, the display device 6 may also serve as the display screen 10.

In such an optical scanning-type touch panel of the present invention, if the explanation is given with respect to the optical unit 1b, for example, as shown in FIG. 1, the projected light from the optical unit 1b is scanned from a position where the projected light enters the light receiving element 13 in a counterclockwise direction in FIG. 1 via a position where the projected light is shielded by the light shielding member 70, and comes to a position (Ps) where the projected light is reflected by an end of the recurrence reflection sheet 7, that is, a scanning start position. Thereafter, the projected light is reflected by the recurrence reflection sheet 7 until it comes to a position (P1) where the projected light reaches one end of the indicator S, but the projected light is shielded by the indicator S up to a position (P2) where it reaches the other end of the indicator S, and then the projected light is reflected by the recurrence reflection sheet 7 until it comes to a scanning end position (Pe).

Figure 3:
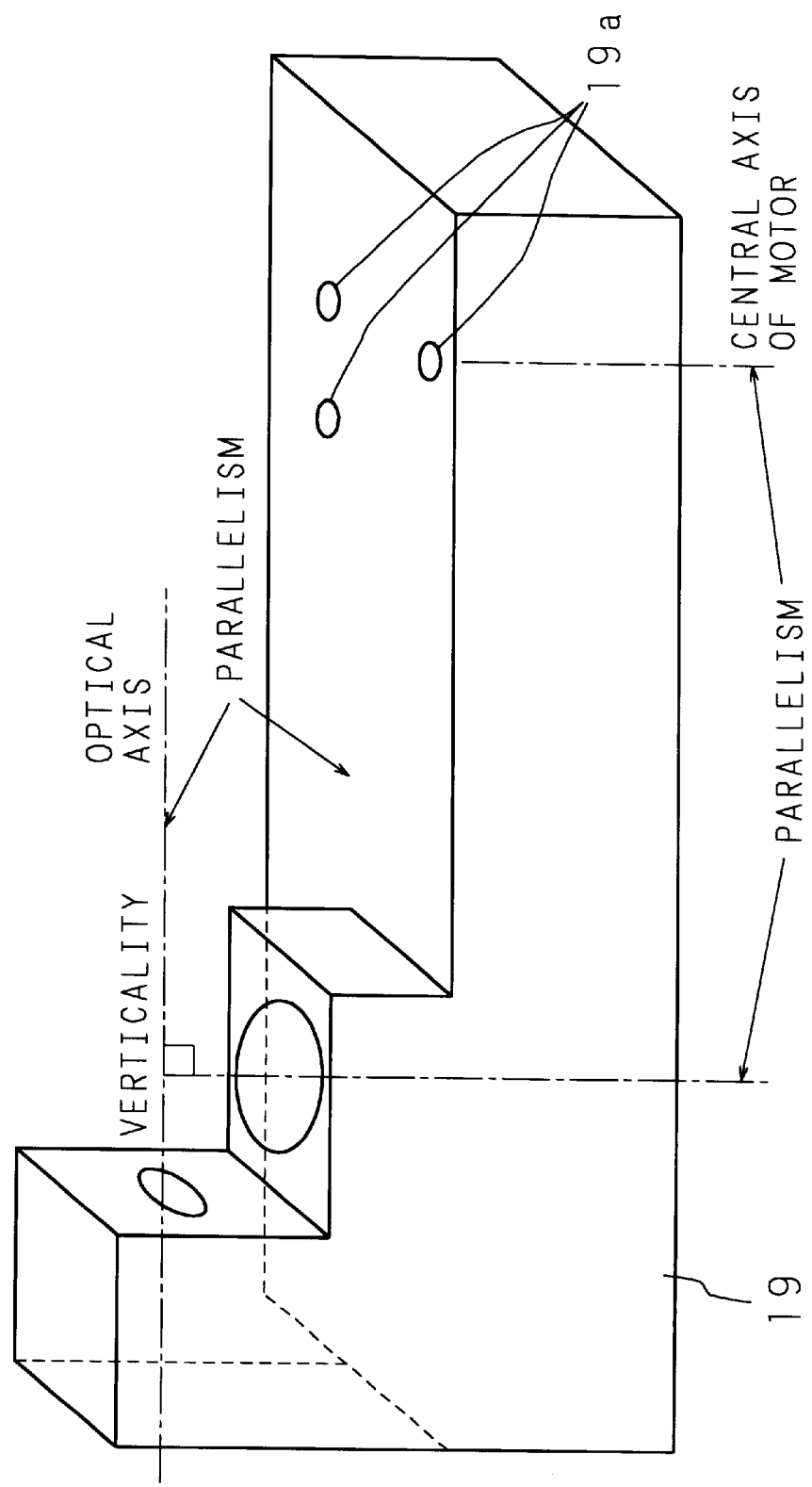
FIG. 3 is an illustration showing an optical unit main body.

Next, the following description will explain the internal structure of the optical units 1a and 1b, which is a characteristic feature of the present invention. Each of the optical units 1a and 1b of the optical scanning-type touch panel of the present invention is constructed by disposing the light emitting system composed of the light emitting element 11, collimation lens 12 and aperture mirror 16; the light receiving system composed of the aperture mirror 16, light receiving lens 17, slit plate 14 and light receiving element 13; and the optical scanning system composed of the polygon mirror 15 and motor 18 in the optical unit main body 19 as shown in FIG. 3. In other words, as to be described later, first, the members of the light emitting system and light receiving system are disposed in the optical unit main body 19 while adjusting the optical axis, and then the optical scanning system is disposed using the motor fixing holes 19a to construct the respective optical units 1a and 1b.

Thus, since all the optical members of the light emitting system, light receiving system and optical scanning system are mounted on a single optical unit main body 19 as one unit, it is possible to regulate the verticality and parallelism with high accuracy between the optical axis and the optical unit main body 19. Moreover, the number of parts and the number of steps of adjusting the optical axis can be reduced, thereby achieving a low cost.

The following description will explain the mounting and structure of the respective optical members.

Optical Scanning System

Figure 4:
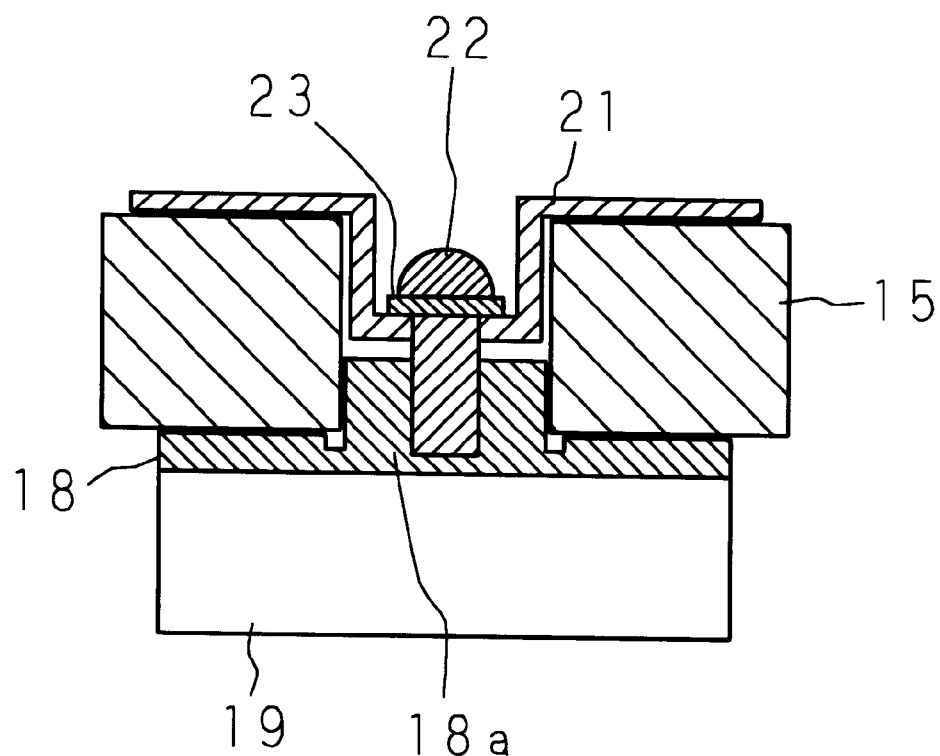
FIG. 4 is a cross sectional view showing one example of mounting of a polygon mirror and a motor.
Figure 5:
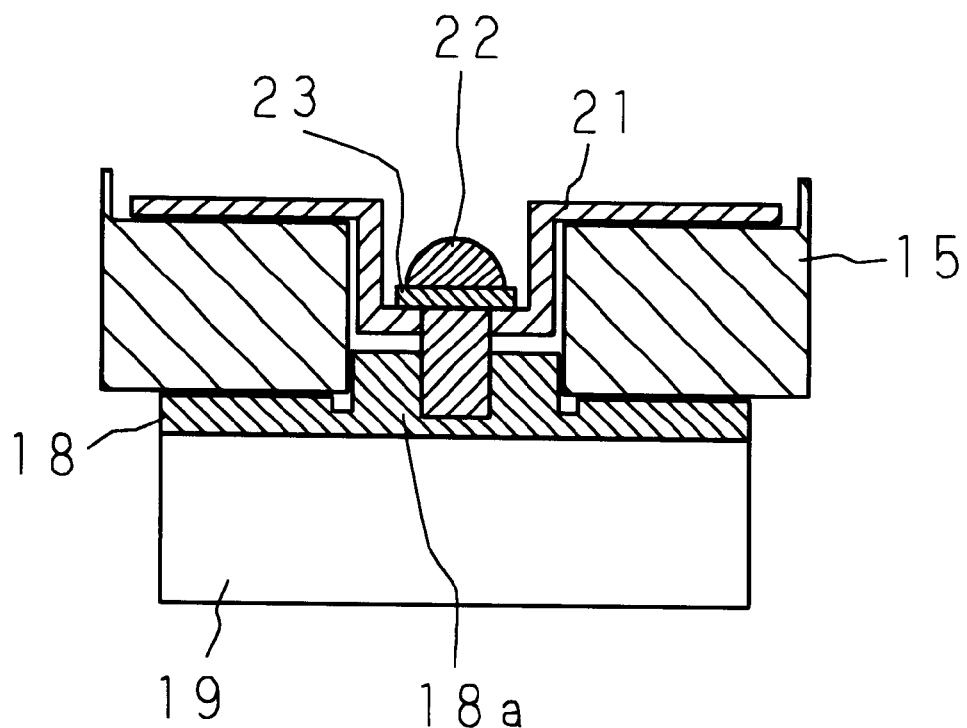
FIG. 5 is a cross sectional view showing another example of mounting of the polygon mirror and motor.
Figure 6:
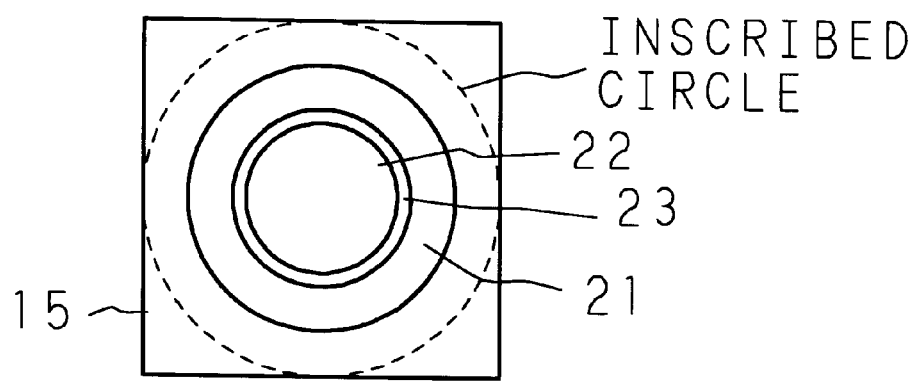
FIG. 6 is an upper view showing an example of mounting of the polygon mirror and motor.

The optical scanning system composed of the polygon mirror 15 and motor 18 is mounted on the optical unit main body 19 with the use of the motor fixing holes 19a. FIG. 4 and FIG. 5 are cross sectional views showing examples of mounting the polygon mirror 15 and motor 18, and FIG. 6 is an upper view thereof. A motor shaft 18a of the motor 18 is inserted into a cylindrical hollow section of the rectangular parallelepiped hollow polygon mirror 15, the upper surface of the polygon mirror 15 is covered with a hollow disc-shaped press plate 21, and the polygon mirror 15 and motor 18 are fixed to the optical unit main body 19 with one screw 22. A ring 23 is interposed between the screw 22 and press plate 21.

Thus, since the polygon mirror 15 and the motor 18 are fixed at one point, the number of working steps for mounting is reduced compared with the number of working steps for fixing of the polygon mirror 15 and motor 18 at a plurality of points. Moreover, since the ring 23 is interposed between the screw 22 and press plate 21, mounting defects due to play at the lower face of the screw neck will not occur.

In the example shown in FIG. 5, the inside of the polygon mirror 15 has a spot-facing structure so that all the press plate 21, screw 22 and ring 23 are contained in the inside of the polygon mirror 15, thereby saving space in a height direction.

As shown in FIG. 6, since the outside diameter of the press plate 21 is made smaller than the diameter of the inscribed circle of the polygon mirror 15, it is possible to contain all the press plate 21, screw 22 and ring 23 inside the polygon mirror 15, thereby saving space.

Figure 7A:
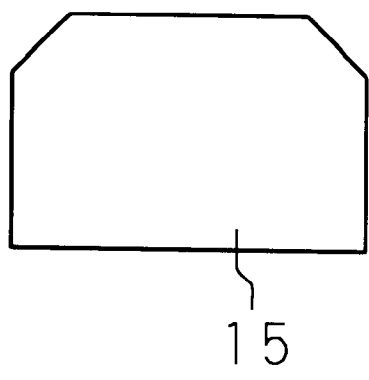
FIGS. 7(a) and 7(b) are illustrations showing an example of a side face of the polygon mirror (optical scanning face)
Figure 7B:
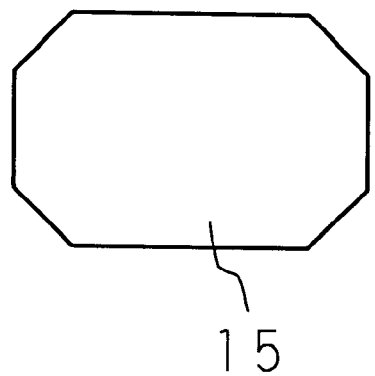

FIGS. 7(a) and 7(b) are schematic diagrams showing an example of a side face of the polygon mirror 15 serving as a light scanning face, in which both ends of the upper portion and/or the lower portion of the side face are chamfered. Therefore, the working efficiency for a mirror finish of the polygon mirror 15 is improved. Moreover, since cutting of the air during rotation decreases, noise is reduced.

Furthermore, this polygon mirror 15 is made of nickel or stainless steel. Although a typical material for the polygon mirror 15 is aluminum, if nickel or stainless steel whose specific gravity is about three times greater than that of aluminum is used, the rotation of the motor 18 is stabilized.

In addition, an aluminum film and an $SiO_2$ film are layered in this order on a surface of the nickel or stainless steel. In an optical position detecting device such as an optical scanning-type touch panel, since the surface reflectance of the polygon mirror is reflected in the SiN ratio, the surface reflectance is an important element, and thus the aluminum film is provided on the surface to improve the surface reflectance. Besides, the $SiO_2$ film performs the function of preventing oxidation of the aluminum film. Furthermore, it is preferred to set the thickness of these aluminum film and $SiO_2$ film according to the wavelength of the laser light so that the reflected light from the surface of the $SiO_2$ film and the reflected light from the interface between the $SiO_2$ film and aluminum film interfere with each other for strengthening.

Figure 8:
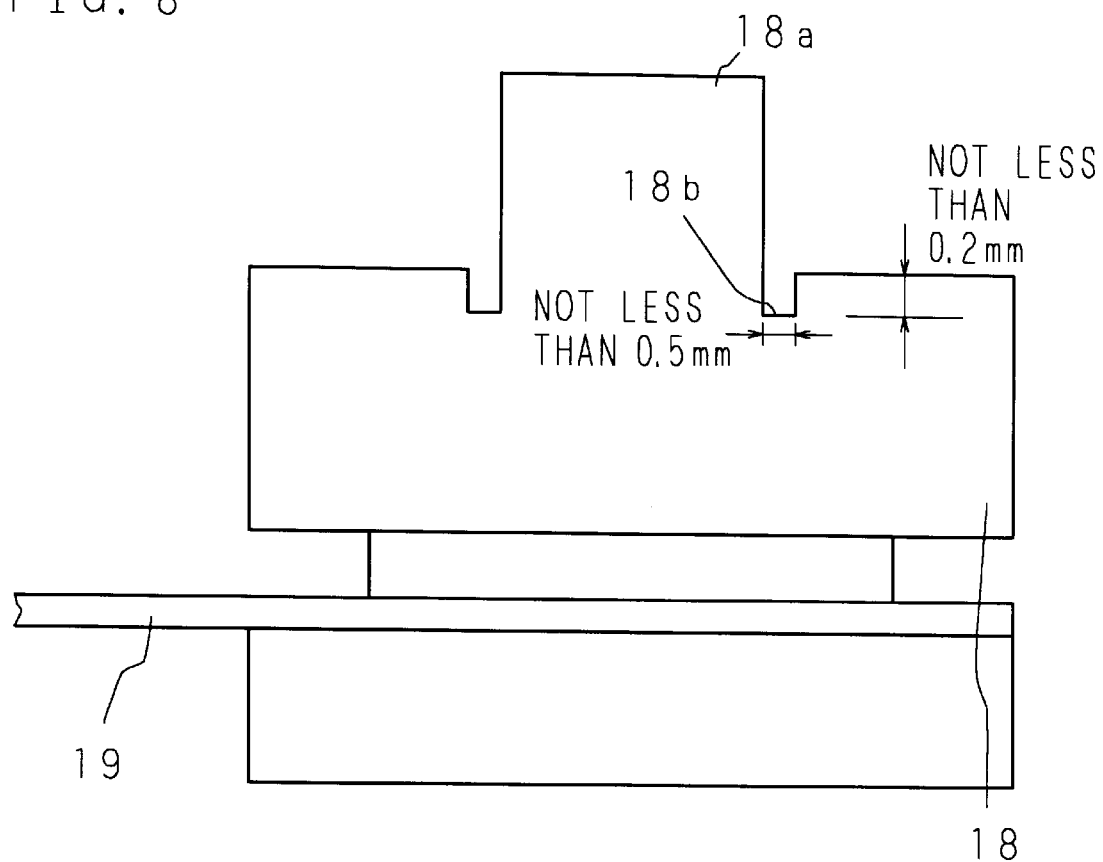
FIG. 8 is an illustration showing a mounted state of the motor on the optical unit main body.

FIG. 8 is an illustration showing a state of mounting of the motor 18 on the optical unit main body 19. As shown in FIG.

8, a ring-shaped groove 18b is formed in a peripheral section of the motor shaft 18a. The width and depth of the groove 18b are not less than 0.5 mm and 0.2 mm, respectively. With the formation of such a groove 18b, it is possible to prevent the vicinity of the motor shaft 18a from having a convex shape. If the vicinity of the motor shaft 18a has a convex shape, the polygon mirror 15 tilts with respect to the motor 18, and therefore the light can not be scanned at a fixed position. Hence, with prior arts, a large number of adjustment steps are required to solve a tilt of the polygon mirror caused by the convex shape. Whereas in the present invention, since the groove 18b is provided to prevent the convex shape, such adjustment steps are not required, thereby significantly shortening the mounting time. Besides, by setting the size of the groove 18b at the above-mentioned values, such a groove 18b can be readily formed.

Collimation Lens

Figure 9:
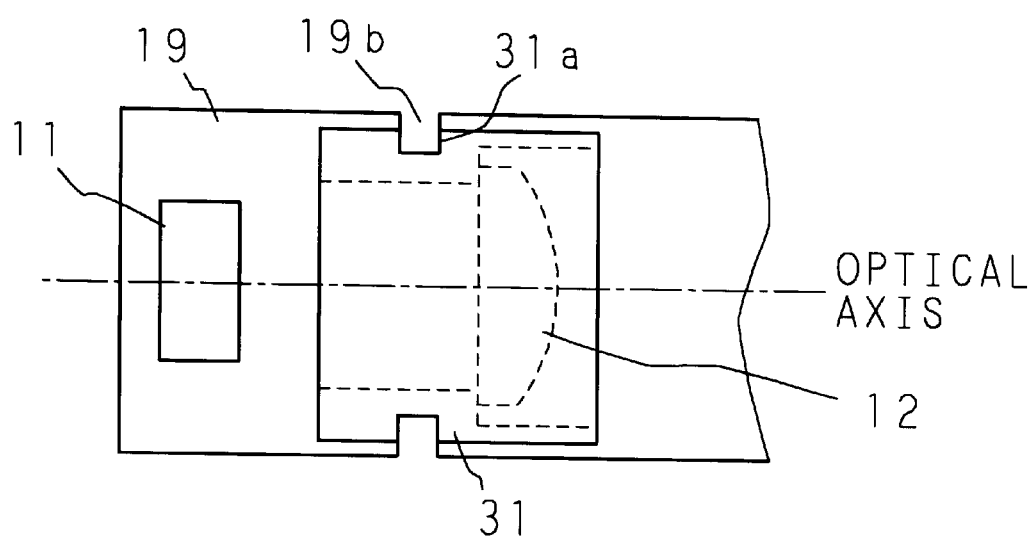
FIG. 9 is an illustration showing a fixed state of a collimation lens.

FIG. 9 is an illustration showing a fixed state of the collimation lens 12. The collimation lens 12 is fixed in a cylindrical lens holder 31 which is inserted into the hollow section of the optical unit main body 19. The peripheral surface of the lens holder 31 has a groove 31 running in a direction perpendicular to the optical axis, and this groove 31a is connected to a hole 19b of the optical unit main body 19. By inserting a later-described deflecting jig 32 into this hole 19b and groove 31a in a direction perpendicular to the optical axis and moving the deflecting jig 32, it is possible to move the lens holder 31 in an optical axis direction.

Figure 10:
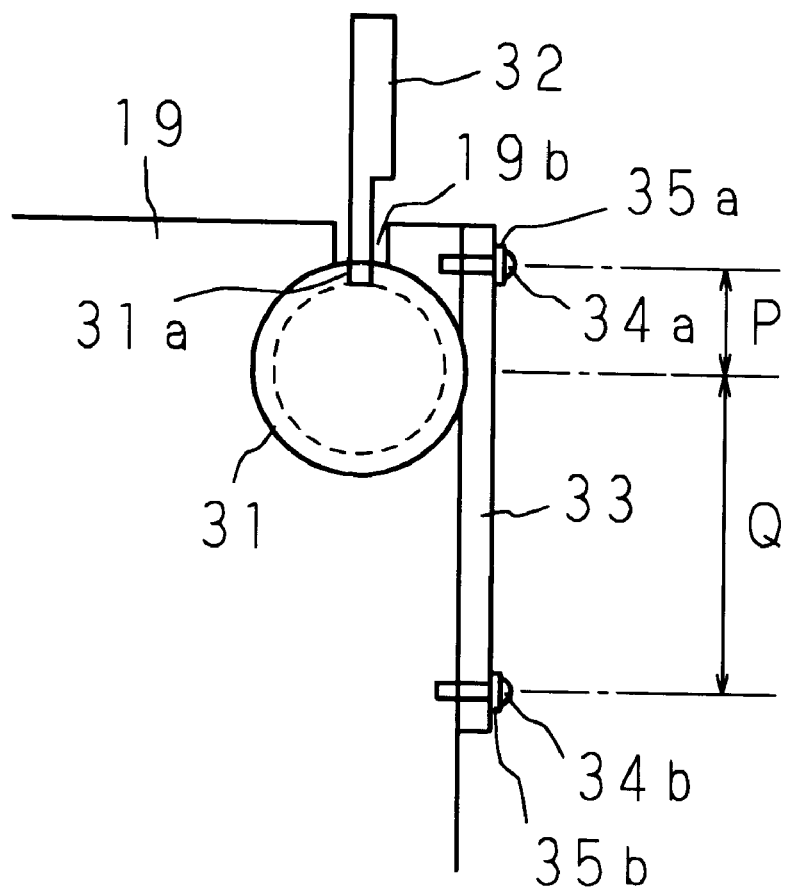
FIG. 10 is an illustration showing a state of implementing of the positional adjustment and fixing of the collimation lens.

FIG. 10 is an illustration showing a state of implementing of the positional adjustment and fixing the collimation lens 12. In order to perform the positional adjustment of the collimation lens 12, a collimate adjustment is carried out by inserting the deflecting jig 32 into the hole 19b and groove 31a in a direction perpendicular to the optical axis and moving the lens holder 31 to make a fine adjustment to the distance between the light emitting element 11 and the collimation lens 12, and, after the adjustment, the lens holder 31 is pressed by a plate spring 33 from a direction perpendicular to the deflecting jig 32 and then the plate spring 33 is fixed using two detachable screws 34a and 34b. At this time, washers 35a and 35b with a diameter larger than the diameter of the respective screws 34a and 34b are interposed between the screws 34a, 35b and the plate spring 33, respectively.

Figure 11:
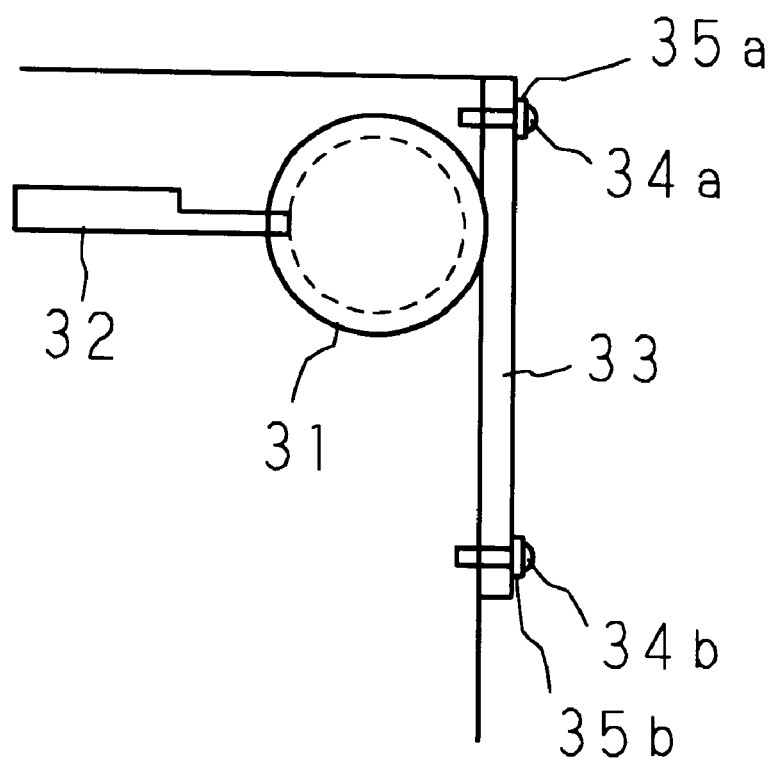
FIG. 11 shows another state of implementing of the positional adjustment and fixing of the collimation lens.

FIG. 11 shows another example of fixing of the plate spring 33, in which, after performing the positional adjustment of the collimation lens 12 in the same manner as in the above-described example, the lens holder 31 is pressed by the plate spring 33 from a direction parallel to the deflecting jig 32, and then the plate spring 33 is fixed with the two detachable screws 34a and 34b.

According to the present invention, since the collimate adjustment is performed in the above-mentioned manner, it is possible to carry out the adjustment with high accuracy and significantly shorten the adjustment time. With prior arts, in general, the lens holder is fixed directly by a screw, and thus there is a high possibility that the lens holder is displaced when tightening the screw and the collimate state is impaired, while the present invention can apply a small pressure to the lens holder 31 during the adjustment because the lens holder 33 is fixed using a plane of the plate spring 33, thereby preventing a sudden big movement of the lens holder 31 and facilitating the collimate adjustment.

Since the washers 35a and 35b with a diameter larger than the diameter of the respective screws 34a and 34b are interposed between the screws 34a, 35b and the plate spring 33, it is possible to press the plate spring 33 with a washer surface, thereby achieving close contact between the lens holder 31 and plate spring 33. Besides, in the case where the lens holder 31 is fixed by the plate spring 33, if an end of the plate spring 33, which is distant from the lens holder 31, is fixed first with the screw 34b and then the other end close to the lens holder 31 is fixed with the screw 34a after the collimate adjustment, it is possible to further improve the close contact between the lens holder 31 and the plate spring 33. Additionally, by arranging the ratio (P:Q in FIG. 10) of the distances from the lens holder 31 to the two fix positions of the plate spring 33 not to be larger than 1:3, it is possible to facilitate the application of a small pressure to the lens holder 31 during the adjustment.

Figure 13:
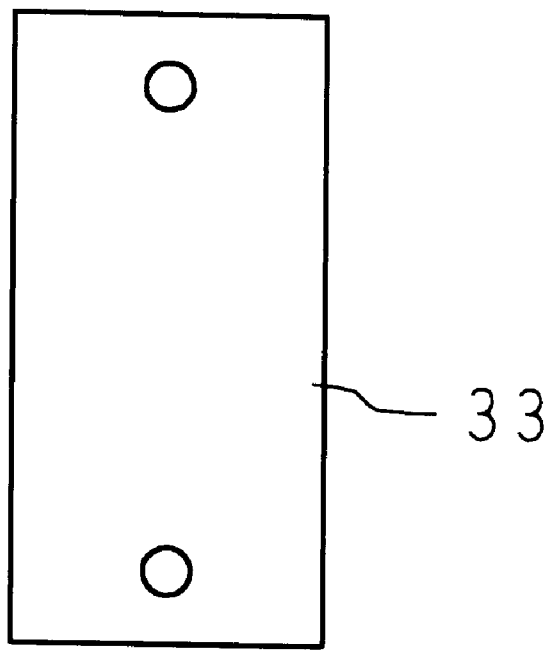
FIG. 13 is an illustration showing another example of the shape of the plate spring.

FIG. 12 through FIG. 14 are illustrations showing the shape of the plate spring 33. In the example shown in FIG. 12, a section which comes into contact with the lens holder 31 is made wider in a concave shape. In the example shown in FIG. 13, the width of the plate spring 33 is larger than the width of the lens holder 31. In the example shown in FIG. 14, a section which comes into contact with the lens holder 31 has a cross shape, and an end portion of the cross-shaped section has a curved surface. By designing the plate spring 33 in a shape as described above, it is possible to prevent the lens holder 31 from tilting or being scratched by an engagement of the plate spring 33 and lens holder 31. Besides, the curved surface of the end portion shown in FIG. 14 can be readily formed by etching.

Light Emitting Element

Figure 15:
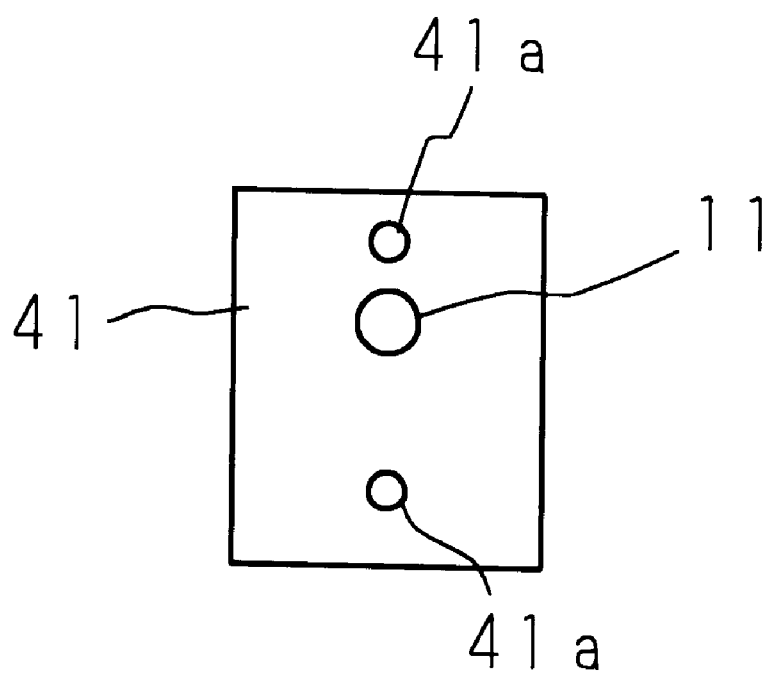
FIG. 15 is an illustration showing one example of a light emitting element fixing substrate.
Figure 16:
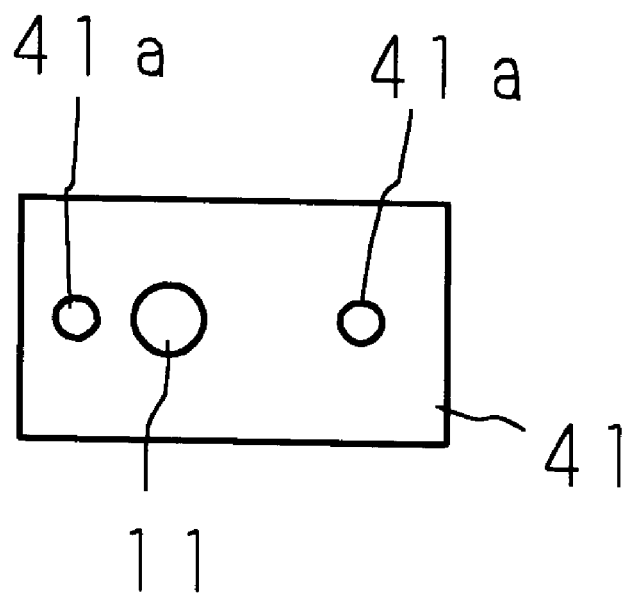
FIG. 16 is an illustration showing another example of the light emitting element fixing substrate.

The light emitting element 11 is fixed to a rectangular parallelepiped light emitting element fixing substrate 41, and this light emitting element fixing substrate 41 is mounted on the optical unit main body 19 with screws so that the light emitting element fixing substrate 41 is parallel and in contact with the optical unit main body 19. FIG. 15 and FIG. 16 are illustrations showing this light emitting element fixing substrate 41 in which two mounting holes 41a are formed. In the example shown in FIG. 15, the two mounting holes 41a and the light emitting element 11 are arranged into a straight line along a Y-axis direction (the axial direction of the motor 18 perpendicular to the Z-axis as the optical axis direction of the light emitting element 11 (the optical axis direction of the reflected light from the aperture mirror 16)), while in the example shown in FIG. 16, the two mounting holes 41a and the light emitting element 11 are arranged into a straight line along an X-axis direction (a direction perpendicular to the Y-axis direction and the Z-axis direction). In such an arrangement, since the light emitting element fixing substrate 41 can move in the X-axis direction and the Y-axis direction in a stable manner, it is possible to significantly reduce the number of working steps required for the X- and Y-axis adjustment of the light emitting element 11.

Figure 17:
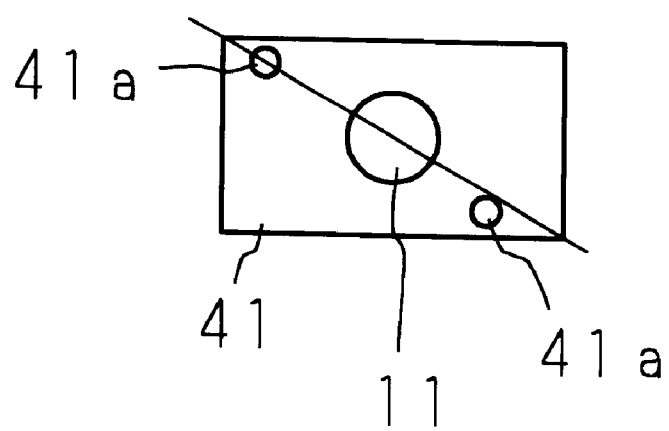
FIG. 17 is an illustrations showing still another example of the light emitting element fixing substrate.

FIG. 17 is an illustration showing another example of the light emitting element fixing substrate 41, in which, unlike the examples shown in FIG. 15 and FIG. 16, the two mounting holes 41a and the light emitting element 11 are not arranged into a straight line. With this arrangement, it is possible to design a more compact light emitting element fixing substrate 41, thereby saving space.

Figure 18:
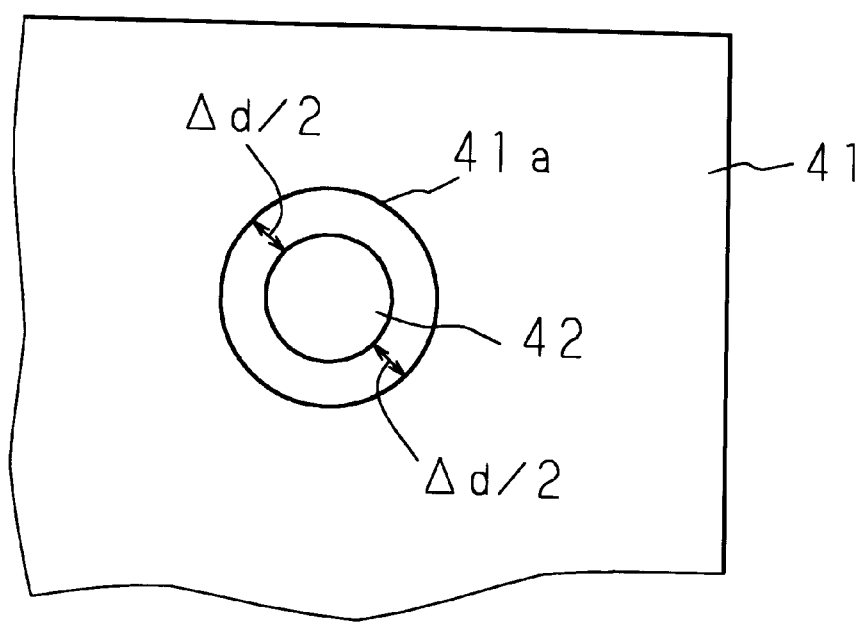
FIG. 18 is an illustration showing the relationship between the sizes of a mounting hole in the light emitting element fixing substrate and a mounting member.
Figure 19:
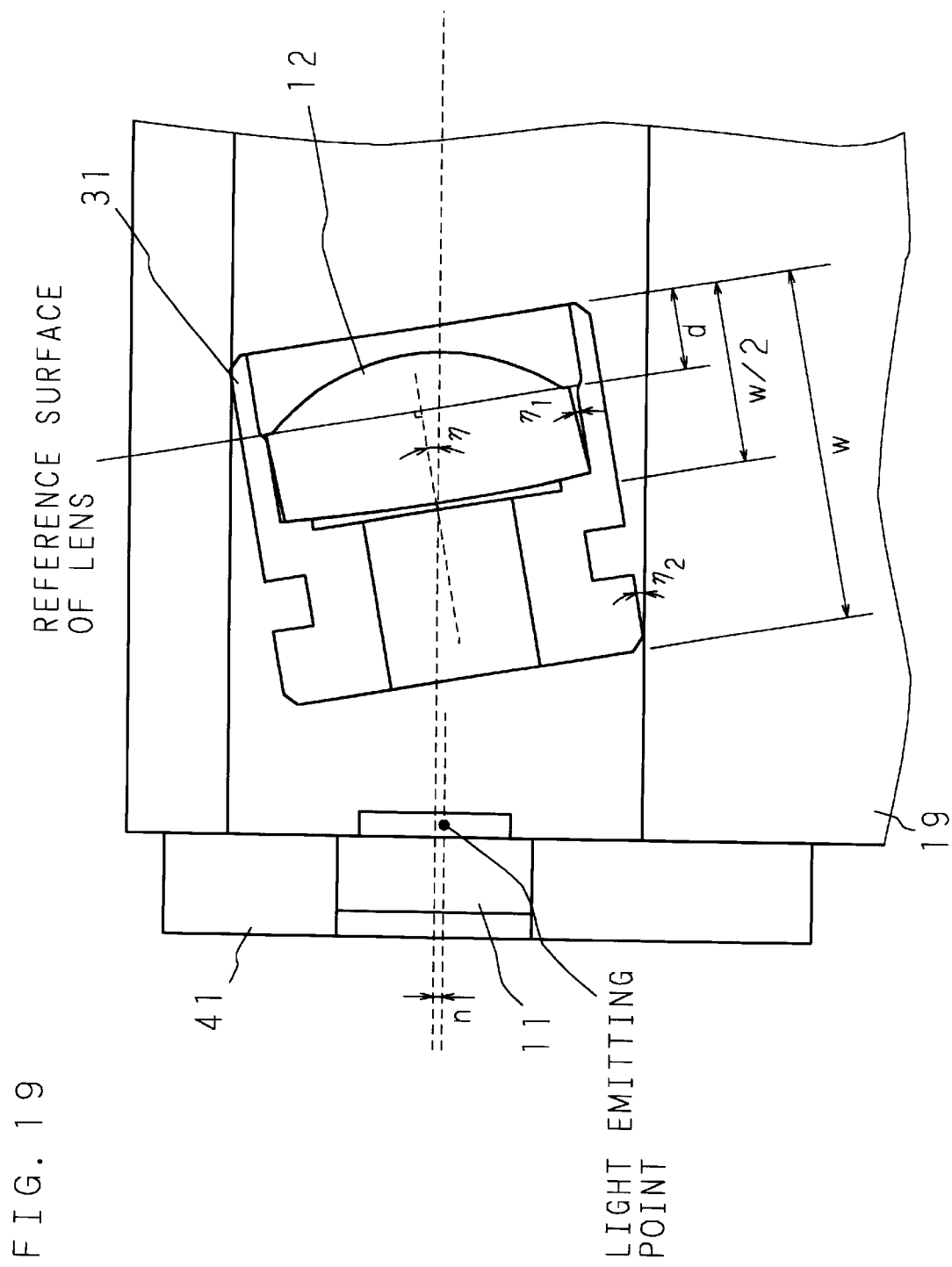
FIG. 19 is an illustration showing the positional relationship among the light emitting element, collimation lens, lens holder and optical unit main body.
Figure 20:
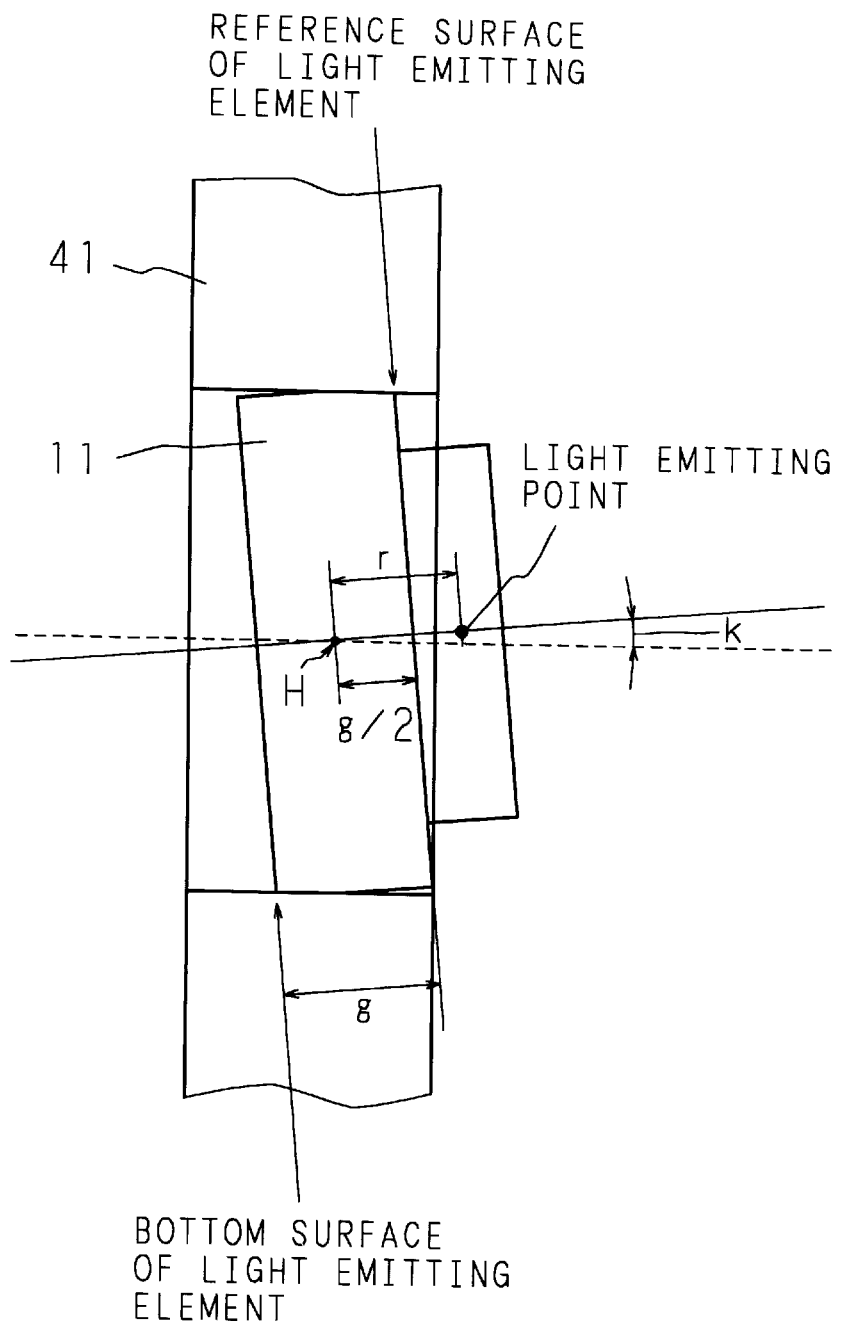
FIG. 20 is an illustration showing the positional relationship between the light emitting element and light emitting element fixing substrate.

FIG. 18 is an illustration showing the relationship between the sizes of the mounting hole 41a in the light emitting element fixing substrate 41 and a mounting member (screw) 42. The radius of the mounting hole 41a is made larger than the radius of the mounting member 42 by an amount of no less than Δd/2. The value Δd satisfies the following conditional expression (A), and more specifically is in a range of around 0.4 to 0.6 mm. Further, FIG. 19 and FIG. 20 are an illustration showing the positional relationship among the light emitting element 11, collimation lens 12, lens holder 31 and optical unit main body 19 and an illustration showing the positional relationship between the light emitting element 11 and light emitting element fixing substrate 41, respectively, and show part of parameters seen in this conditional expression (A).

$$\Delta d/2 \geq (X^2+Y^2)^{1/2} \quad (A)$$

where

X=(w/2−d)·sinθ+m+r·sinj
Y=(w/2−d)·sinη+n+r·sink
θ=θ$_1$+θ$_2$

θ$_1$: a tilt of the collimation lens 12 with respect to the lens holder 31 about the X-axis;

θ$_2$: a tilt of the lens holder 31 with respect to the optical unit main body 19 about the X-axis;

η$_1$: a tilt of the collimation lens 12 with respect to the lens holder 31 about the Y-axis;

η$_2$: a tilt of the lens holder 31 with respect to the optical unit main body 19 about the Y-axis;

w: a length of the lens holder 31;

d: a length from the reference surface of the collimation lens 12 to the exit-side end face of the lens holder 31;

r: a length from a point H (the intersection of a line normal to the reference surface of the light emitting element 11 and the Z-axis) to a light emitting point;

m: a self-deviation of the light emitting point of the light emitting element 11 with respect to the X-axis;

n: a self-deviation of the light emitting point of the light emitting element 11 with respect to the Y-axis;

j: a tilt of a line normal to the reference surface of the light emitting element 11 with respect to the Z-axis about the X-axis; and k: a tilt of a line normal to the reference surface of the light emitting element 11 with respect to the Z-axis about the Y-axis.

Thus, since the radius of the mounting hole 41a is made larger than the radius of the mounting member 42 by an amount of no less than Δd/2, the light emitting element 11 fixed to the light emitting element fixing substrate 41 can obtain a necessary movable range during the X- and Y-axis adjustment, thereby permitting a significant reduction in the number of working steps required for the X- and Y-axis adjustment.

Aperture Mirror

Figure 21:
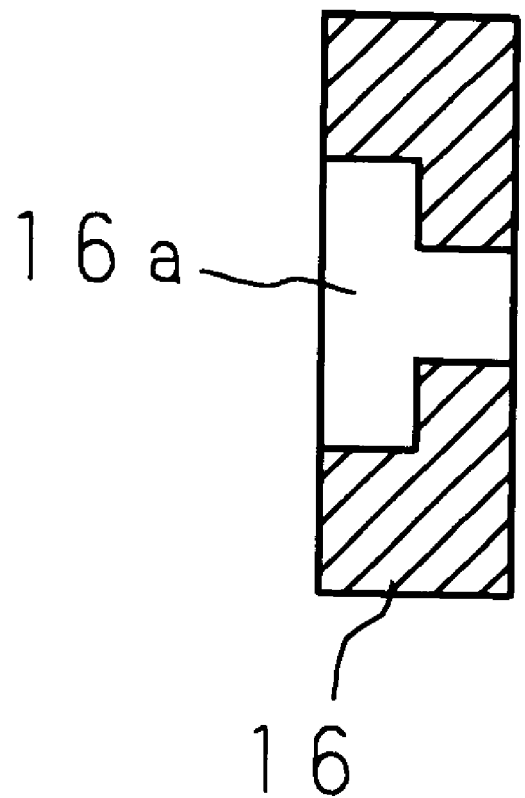
FIG. 21 is a cross sectional view showing the structure of an aperture.
Figure 22A:
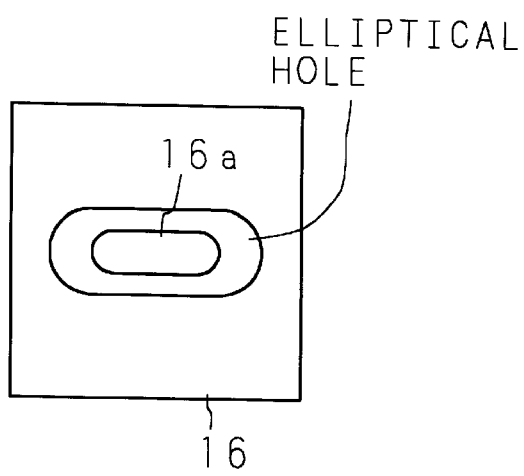
FIGS. 22(a) and 22(b) are plan views showing the structure of the aperture.
Figure 22B:
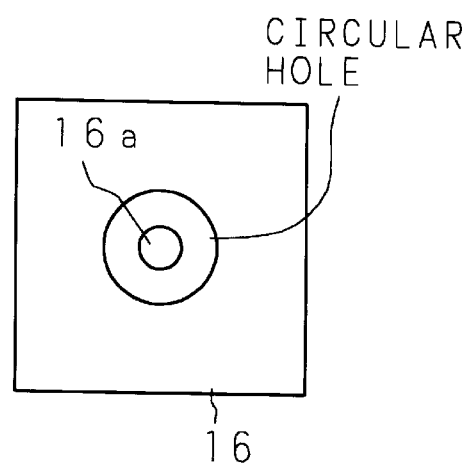

FIG. 21, FIGS. 22(a) and 22(b) are cross sectional view and plan views showing the structure of the aperture 16a of the aperture mirror 16. The aperture 16a for limiting the size of parallel light from the collimation lens 12 is formed in two or more stages so that the diameter in a stage closer to the collimation lens 12 is larger than that in the other stage, and the aperture 16a is formed in the shape of an elliptical hole (FIG. 22(a)) or a circular hole (FIG. 22(b)). Besides, the inner surface of the aperture 16a does not have a mirror finish and has a low reflectance.

By providing the aperture 16a in a plurality of stages, it is possible to reduce reflection at the inner surface of the aperture 16a. Moreover, by forming the aperture 16a in the shape of an elliptical hole or circular hole, it is possible to reduce the diffraction or reflection of light. Furthermore, by lowering the reflectance of the inner surface of the aperture 16a, it is possible to reduce reflection at the inner surface. It is therefore possible to prevent light other than parallel light from being projected onto the polygon mirror 15.

Figure 23:
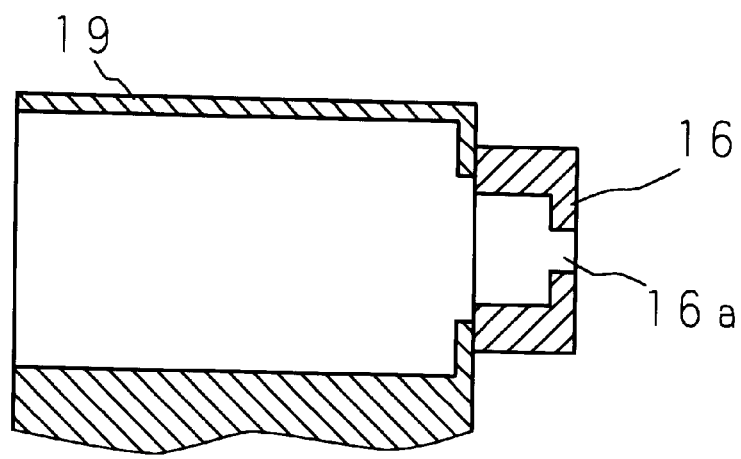
FIG. 23 is an illustration showing one example of the relationship between the structure of the aperture and the optical unit main body.
Figure 24:
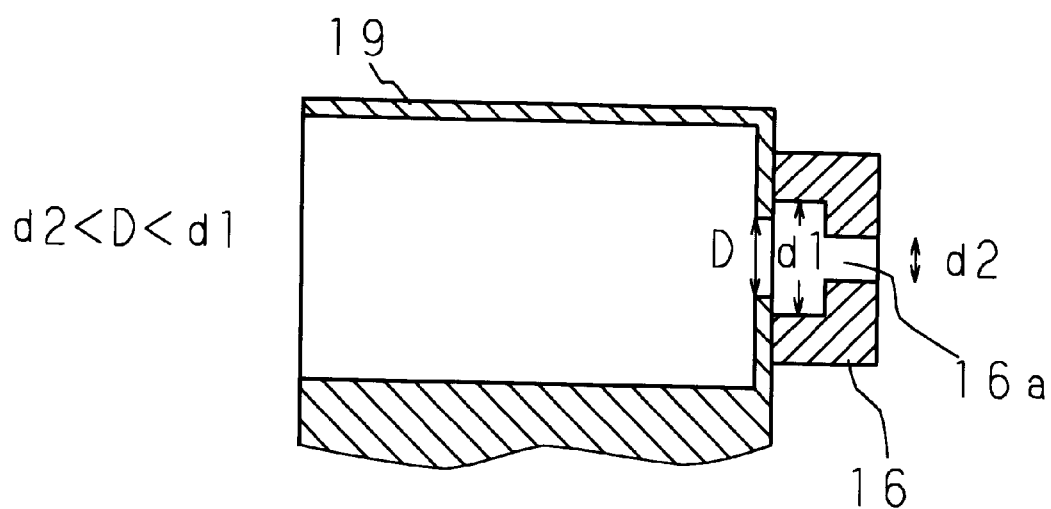
FIG. 24 is an illustration showing another example of the relationship between the structure of the aperture and the optical unit main body.

FIG. 23 and FIG. 24 are illustrations showing the relationship between the structure of the aperture 16a and the optical unit main body 19. In the example shown in FIG. 23, the optical unit main body 19 has a reduced thickness (a thickness of not more than 1 mm) at a portion where the aperture mirror 16 is to be mounted (the exit for parallel light from the collimation lens 12) so as to reduce the diffraction or reflection of light at the aperture 16a. In the example shown in FIG. 24, a diameter (D) of an opening of the optical unit main body 19 where the aperture mirror 16 is to be mounted (the diameter of the exit for parallel light from the collimation lens 12) is larger than a diameter (d2) of the exit of the aperture 16a but is smaller than a diameter (d1) of the entrance of the aperture 16a so as to reduce the diffraction or reflection of light at the aperture 16a.

Figure 25:
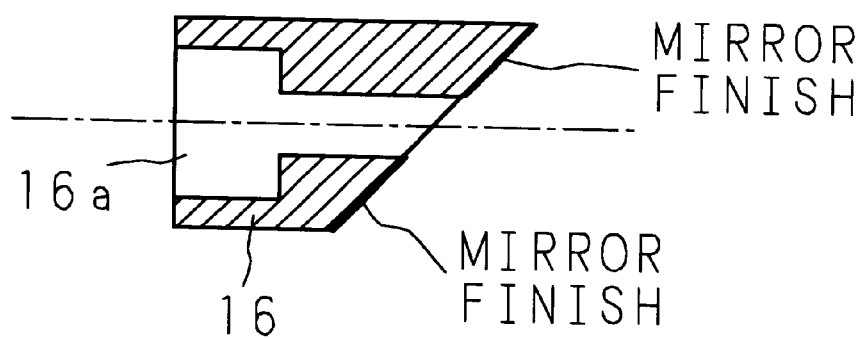
FIG. 25 is a structural illustration of one example of an aperture mirror.

FIG. 25 is a structural illustration of one example of the aperture mirror 16. In the example shown in FIG. 25, a surface of the aperture mirror 16, which faces the polygon mirror 15, has a mirror finish so that light returned from the recurrence reflection sheet 7 is efficiently guided to the light receiving system (light receiving lens 17) by this mirror section. In such an aperture mirror 16, since the aperture 16a and the mirror section are formed as one body, it is possible to readily increase the accuracy of the parallelism between the optical axis and the aperture mirror 16.

Figure 26:
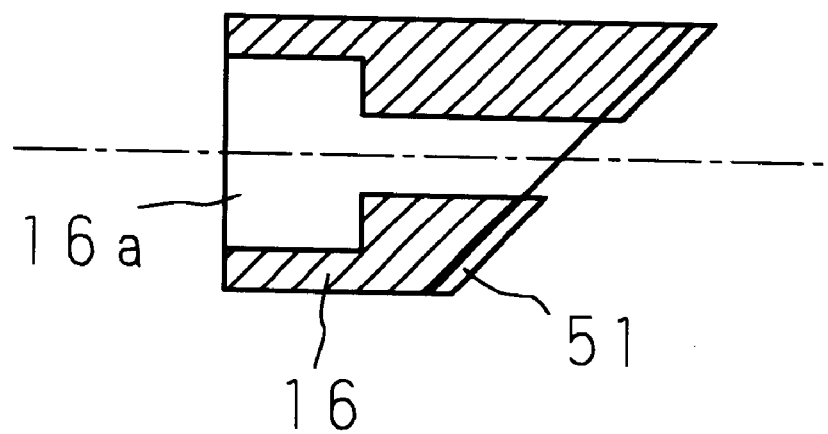
FIG. 26 is a structural illustration of another example of the aperture mirror.

FIG. 26 is a structural illustration of another example of the aperture mirror 16. In the example shown in FIG. 26, a mirror 51 is attached to a surface of the aperture mirror 16, which faces the polygon mirror 15, so that light returned from the recurrence reflection sheet 7 is efficiently guided to the light receiving system (light receiving lens 17) by this mirror 51. In such an aperture mirror 16, a mirror finish is unnecessary, thereby achieving a low cost.

Figure 27:
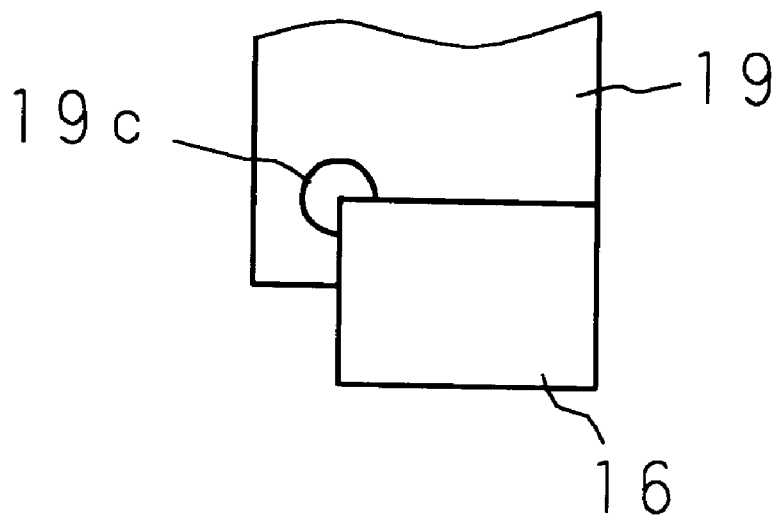
FIG. 27 is an illustration showing one example of a state of mounting of the aperture mirror on the optical unit main body.
Figure 28:
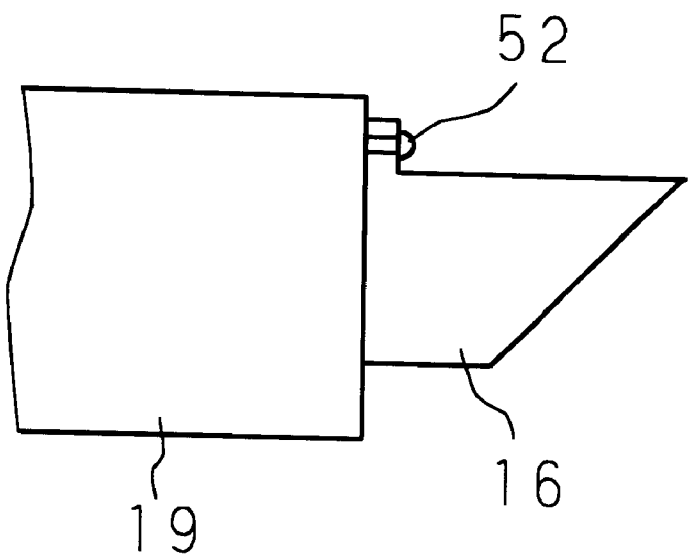
FIG. 28 is an illustration showing another example of a state of mounting of the aperture mirror on the optical unit main body.

FIG. 27 and FIG. 28 are illustrations showing a state of mounting of the aperture mirror 16 on the optical unit main body 19. In the example shown in FIG. 27, positioning of the aperture mirror 16 with respect to the optical unit main body 19 is implemented by a move-and-touch structure, thereby achieving parallelism between the optical axis and the aperture mirror 16 with high accuracy. Moreover, in the example shown in FIG. 27, since a clearance hole 19c is formed at a portion of the optical unit main body 19 toward which the aperture mirror 16 is moved to touch, a sufficient light receiving area is ensured, thereby improving the S/N ratio. In the example shown in FIG. 28, the aperture mirror 16 is mounted on the optical unit main body 19 by a detachable mounting member 52, and this mounting has the advantage of easy replacement of the aperture mirror 16 because the aperture mirror 16 is not fixed by adhesion.

Light Receiving Lens

Figure 29:
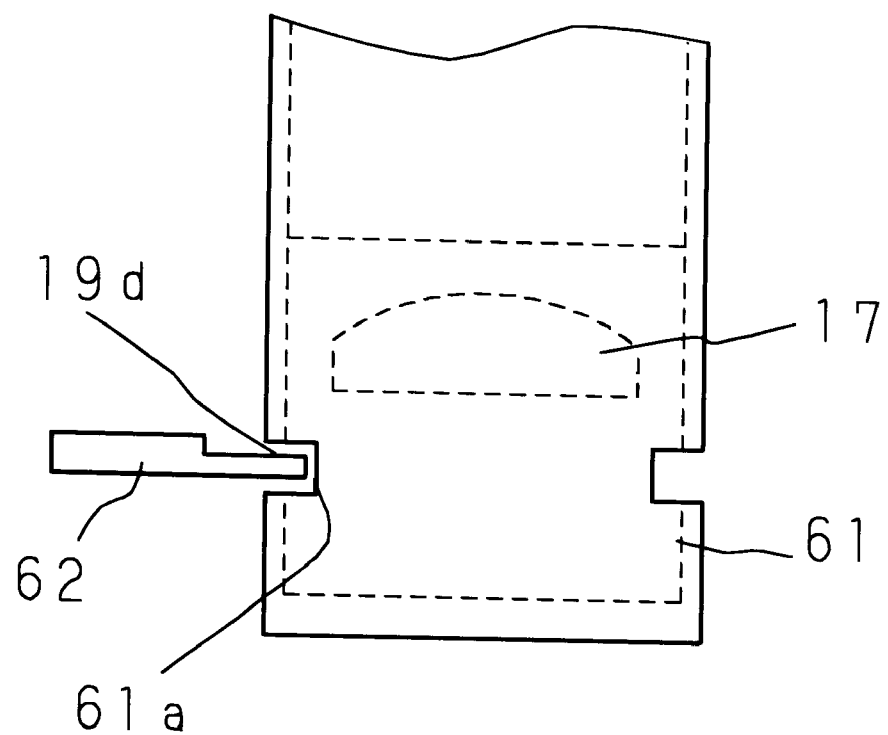
FIG. 29 is an illustration showing a state of implementing of the positional adjustment and fixing of a light receiving lens.

The light receiving lens 17 can perform an optical axis adjustment similar to that described for the collimation lens 12. FIG. 29 is an illustration showing a state of implementing the positional adjustment and fixing of the light receiving lens 17. The light receiving lens 17 is fixed in a cylindrical lens holder 61 which is fitted into the hollow section of the optical unit main body 19. The peripheral surface of the lens holder 61 has a groove 61a running in a direction perpendicular to the optical axis, and this groove 61a is connected to a hole 19d of the optical unit main body 19. By inserting a later-described deflecting jig 62 into this hole 19d and groove 61a in a direction perpendicular to the optical axis and moving the deflecting jig 62, it is possible to move the lens holder 61 having the light receiving lens 17 fixed therein in an optical axis direction.

Further, in order to perform the positional adjustment of the light receiving lens 17, a focus adjustment is carried out by inserting the deflecting jig 62 into the hole 19d and groove 61a in a direction perpendicular to the optical axis and moving the lens holder 61 to make a fine adjustment to the distance between the light receiving element 13 and the light receiving lens 17, and, after the adjustment, the lens holder 61 is pressed by a plate spring and fixed with screws in the same manner as in the collimation lens 12. Accordingly, it is possible to significantly reduce the adjustment time of the light receiving lens 17.

Slit Plate 14

FIG. 30 is an illustration showing an example of the structure of the slit plate 14, in which the length of a screw hole 71 for mounting the slit plate 14 on the optical unit main body 19, in a direction perpendicular to a longitudinal direction of the slit 14*a*, is longer than the diameter of a screw 72 to give play in the screw hole 71 so as to permit the slit plate 14 to slide, and the slit plate 14 is mounted so that it can slide. Accordingly, positioning of the slit 14*a* of the slit plate 14 can be performed accurately.

Figure 31:
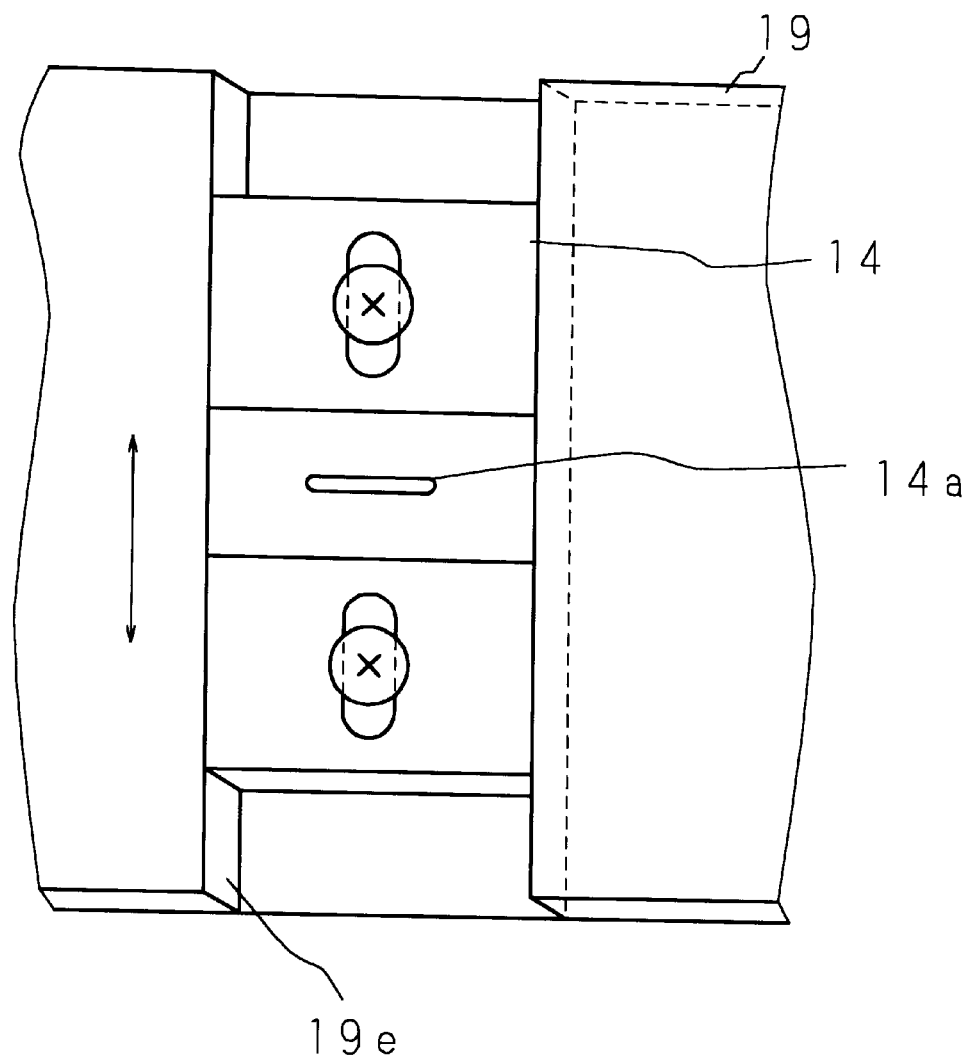
FIG. 31 is an illustration showing one example of mounting of the slit plate on the optical unit main body.

FIG. 31 is an illustration showing an example of mounting of the slit plate 14 on the optical unit main body 19. In this structure, the slide direction of the slit plate 14 is limited to one direction by inserting the slit plate 14 into a groove-type holding structure section 19*e* of the optical unit main body 19.

Figure 32:
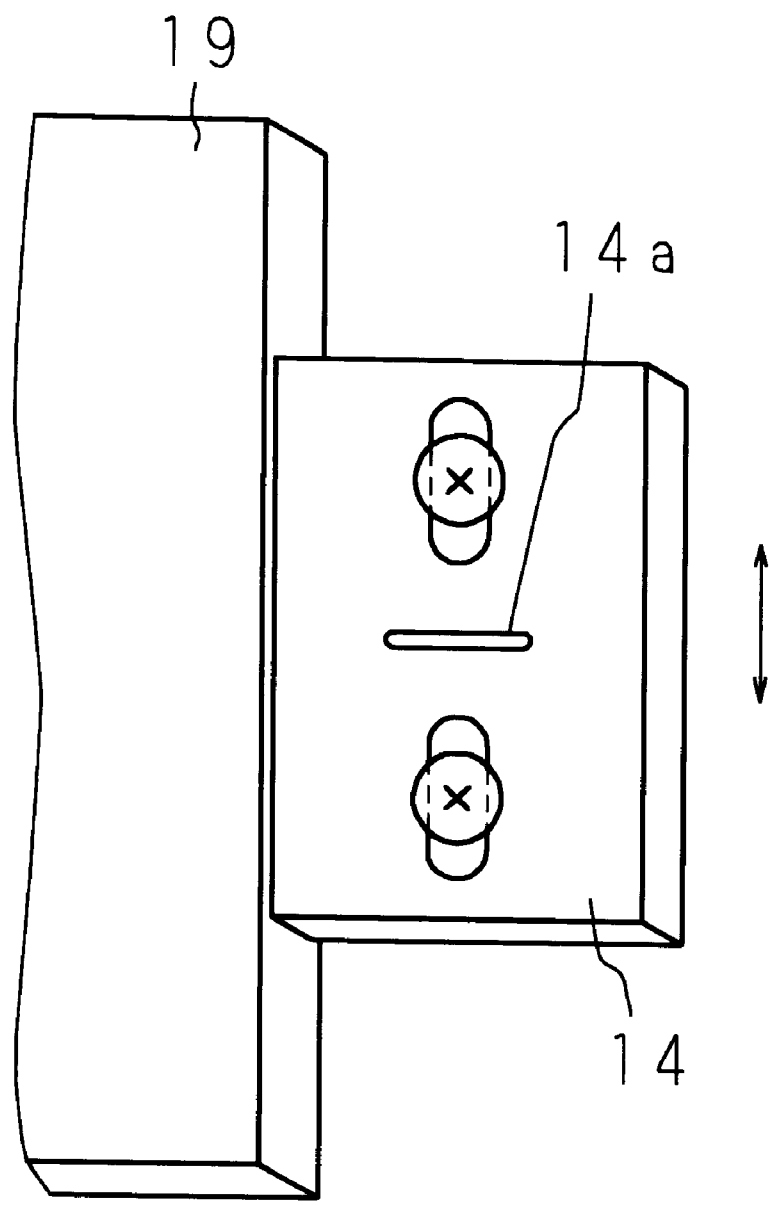
FIG. 32 is an illustration showing another example of mounting of the slit plate on the optical unit main body.

FIG. 32 is an illustration showing another example of mounting of the slit plate 14 on the optical unit main body 19. In this structure, the slit plate 14 is mounted by pushing one side of the slit plate 14 against the optical unit main body 19, thereby limiting the moving direction of the slit plate 14.

Next, the following description will explain a process of mounting the above-mentioned optical members on the optical unit main body 19. First, the lens holder 31 on which the collimation lens 12 is fixed is placed in the optical unit main body 19, and the lens holder 31 is mounted on the optical unit main body 19 while performing a collimate adjustment. Subsequently, the light emitting element fixing substrate 41 on which the light emitting element 11 is fixed is mounted while performing the X-axis and Y-axis adjustment. Next, the aperture mirror 16 is mounted while correcting the aperture. At this time, the collimate adjustment should be confirmed. Subsequently, the lens holder 61 on which the light receiving lens 17 is fixed is placed in the optical lens unit 19, and the lens holder 61 is mounted on the optical unit main body 19 while performing a light focus adjustment. Then, the slit plate 14 is mounted so that it performs a desired slit function by preventing the effect of disturbing light such as illumination light. At this time, the focus adjustment should be confirmed. Next, the polygon mirror 15 and motor 18 are mounted on the optical unit main body 19 with the use of the motor fixing holes 19*a*. In this case, since the motor fixing holes 19*a* and the optical unit main body 19 are formed as one body, the positioning of the motor fixing holes 19*a* and the optical axis has been already performed, and thus it is only necessary to simply mount the polygon mirror 15 and motor 18 in the motor fixing holes 19*a* without the necessity of precise adjustment of the optical scanning system. Finally, the light receiving element 13 is mounted.

Figure 33:
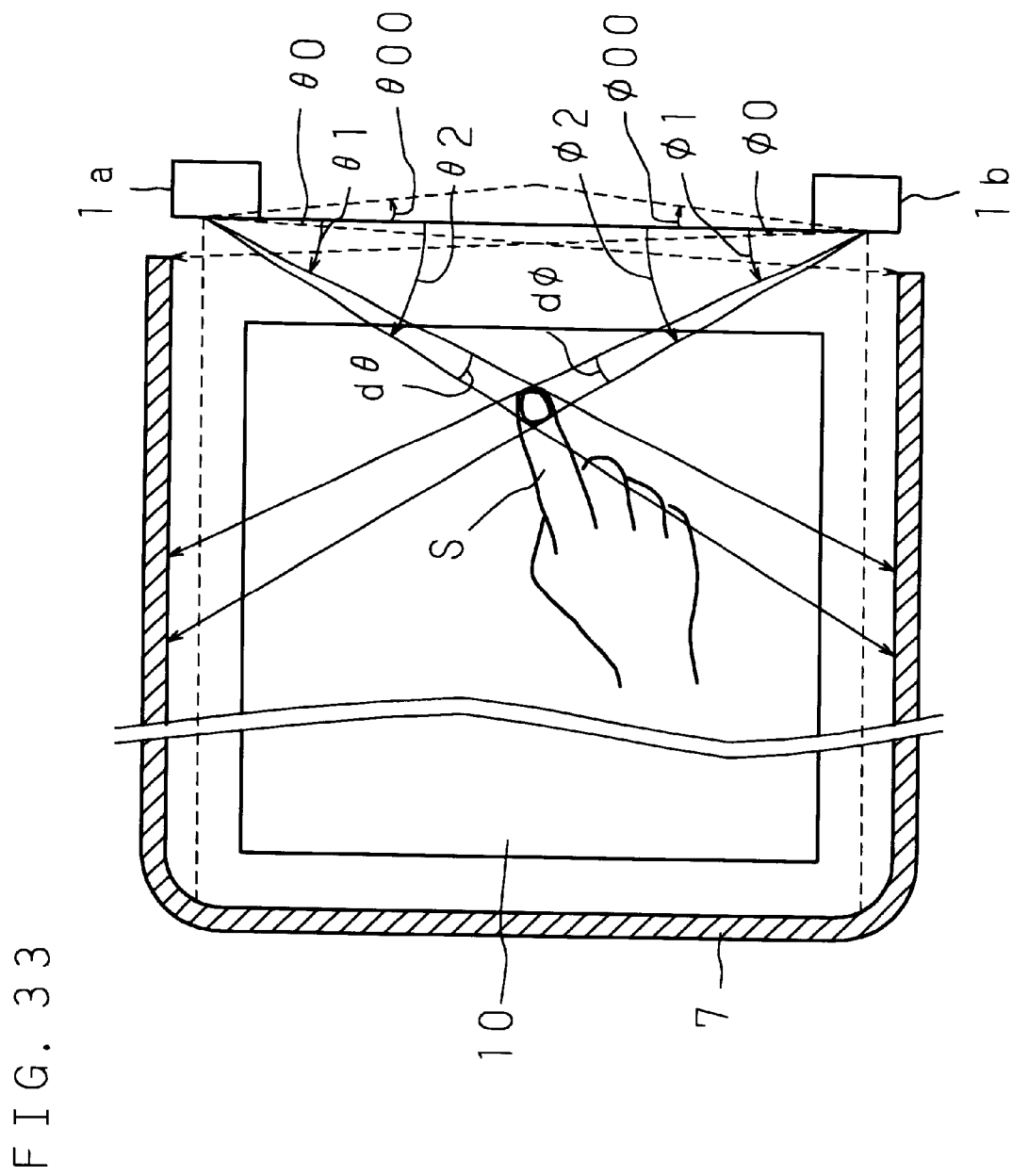
FIG. 33 is a schematic diagram showing a state of implementing of the optical scanning-type touch panel.

Next, the following description will explain an operation of calculating the position and size of the indicator S by the optical scanning-type touch panel of the present invention. FIG. 33 is a schematic diagram showing a state of implementing of the optical scanning-type touch panel. In FIG. 33, however, illustration of the constituent members other than the optical units 1*a*, 1*b*, recurrence reflection sheet 7 and display screen 10 is omitted. Incidentally, FIG. 33 shows an example in which a finger is used as the indicator S.

The MPU 5 controls the polygon controller 4 to rotate the respective polygon mirrors 15 in the optical units 1*a* and 1*b*, and thereby angularly scanning the laser light from the respective light emitting elements 11. As a result, the reflected light from the recurrence reflection sheet 7 enters the respective light receiving elements 13. The amounts of the received light that entered the respective light receiving elements 13 as mentioned above are obtained as the light receiving signals which are the outputs of light receiving signal detectors 3*a* and 3*b*.

Further, in FIG. 33, $\theta 00$ and $\phi 00$ represent the angles from a reference line connecting both of the optical units 1*a* and 1*b* to the respective light receiving elements, $\theta 0$ and $\phi 0$ represent the angles from the reference line connecting both of the optical units 1*a* and 1*b* to the ends of the recurrence reflection sheet 7, $\theta 1$ and $\phi 1$ represent the angles from the reference line to one end of the indicator S on the reference line side, and $\theta 2$ and $\phi 2$ represent the angles from the reference line to another end of the indicator S on the opposite side to the reference side, respectively.

Figure 34:
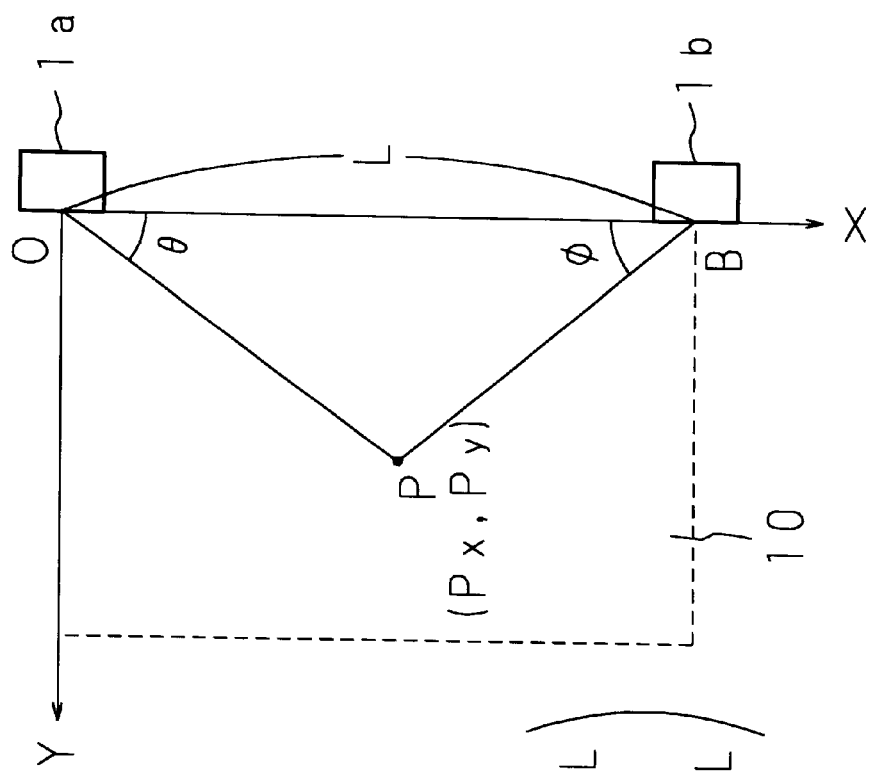
FIG. 34 is a schematic diagram showing the principle of triangulation for detecting a coordinate.

When the indicator S is present in the optical path of the scanning light on the display screen 10, the light projected from the optical units 1*a* and 1*b* and then reflected from the indicator S does not enter the light receiving elements 13. Therefore, in a state as shown in FIG. 33, the reflected light does not enter the light receiving element 13 in the optical unit 1*a* when the scanning angle is in a range between 0° and $\theta 0$, the reflected light enters that light receiving element 13 when the scanning angle is in a range between $\theta 0$ and $\theta 1$, and the reflected light does not enter that light receiving element 13 when the scanning angle is in a range between $\theta 1$ and $\theta 2$. Similarly, the reflected light does not enter the light receiving element 13 in the optical unit 1*b* when the scanning angle is in a range between 0° and $\phi 0$, the reflected light enters that light receiving element 13 when the scanning angle is in a range between $\phi 0$ and $\phi 1$, and the reflected light does not enter that light receiving element 13 when the scanning angle is in a range between $\phi 1$ and $\phi 2$, Next, the following description will explain a process of calculating a coordinate of a central position (indicated position) of the indicator S (a finger in this example) from the cut-off range calculated in the above-mentioned manner. First, the conversion of an angle into an orthogonal coordinate based on the triangulation will be explained. As shown in FIG. 34, the position of the optical unit 1*a* is set as an origin O, the right side and upper side of the display screen 10 are set as the X-axis and Y-axis, and the length of the reference line (the distance between the optical units 1*a* and 1*b*) is set as L. Moreover, the position of the optical unit 1*b* is set as B. When a central point P(Px, Py) on the display screen 10 indicated by the indicator S is positioned at angles of $\theta$ and $\phi$ with respect to the X-axis from the optical units 1*a* and 1*b*, the values of X coordinate Px and Y coordinate Py of the point P can be calculated according to the principle of the triangulation as shown by equations (1) and (2) below, respectively.

$$Px(\theta,\phi) = (\tan\phi) \div (\tan\theta + \tan\phi) \times L \qquad (1)$$

$$Py(\theta,\phi) = (\tan\theta \cdot \tan\phi) \div (\tan\theta + \tan\phi) \times L \qquad (2)$$

Figure 35:
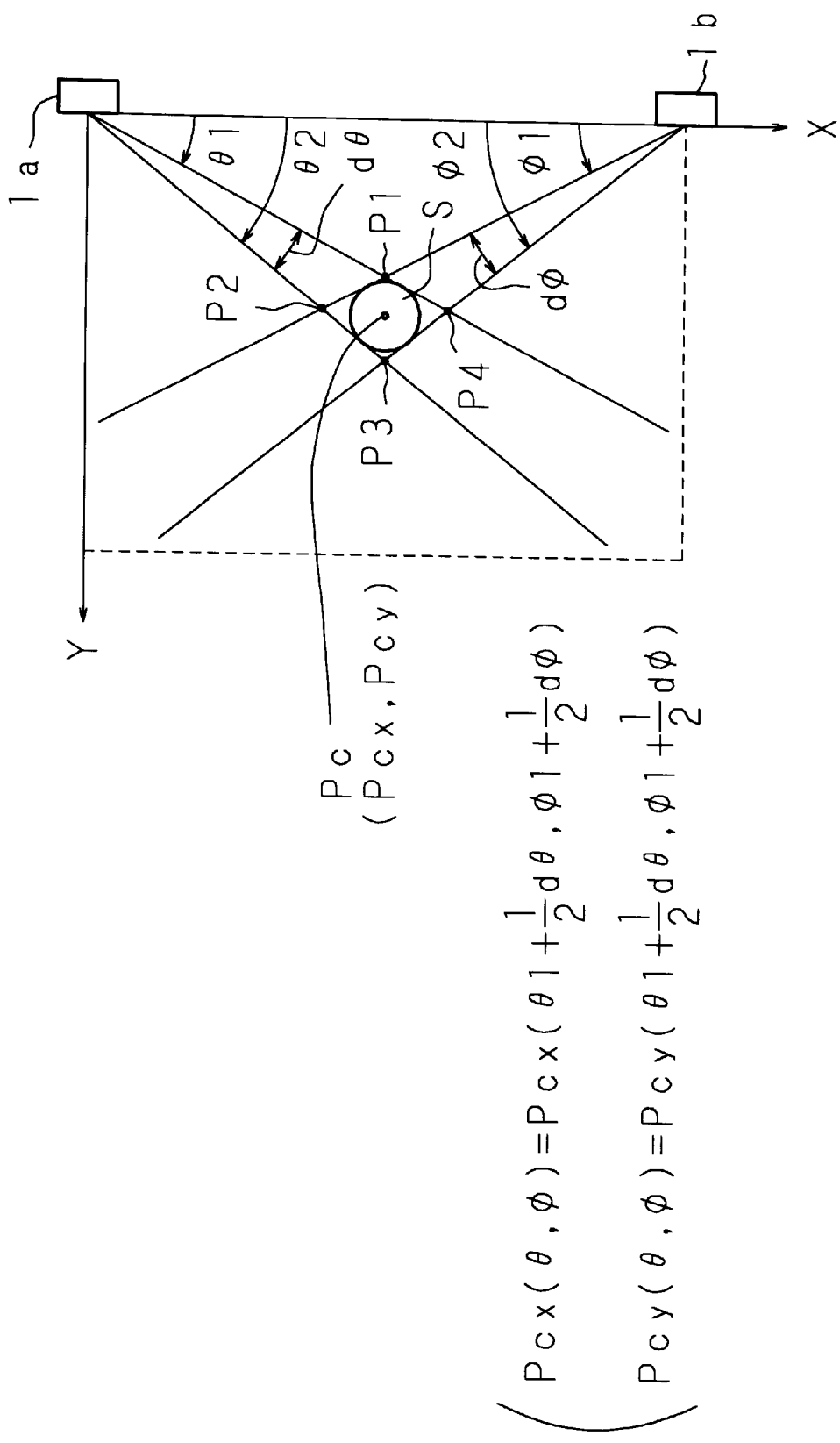
FIG. 35 is a schematic diagram showing an indicator and a cut-off range.

By the way, since the indicator S (finger) has a dimension, when the detection angle at the timing of rise/fall of the detected light receiving signal is adopted, as shown in FIG. 35, four points (P1 through P4 in FIG. 35) on the edge of the indicator S (finger) are detected. These four points are all different from the indicated central point (Pc in FIG. 35). Thus, a coordinate (Pcx, Pcy) of the central point Pc is calculated as follows. Pcx and Pcy can be expressed as shown by the following equations (3) and (4), respectively.

$$Pcx(\theta,\phi)=Pcx(\theta 2+d\theta/2, \phi 1+d\phi/2) \quad (3)$$

$$Pcy(\theta,\phi)=Pcy(\theta 1+d\theta/2, \phi 1+d\phi/2) \quad (4)$$

Then, by substituting $\theta 1+d\theta/2$ and $\phi 1+d\phi/2$ expressed by equations (3) and (4) for $\theta$ and $\phi$ of equations (1) and (2) above, the coordinate of the indicated central point Pc can be obtained.

In the above-mentioned example, the average value of the angle is calculated first and then substituted into the triangulation converting equations (1) and (2) to calculate the coordinate of the central point Pc as the indicated position. However, it is also possible to calculate the coordinate of the central point Pc by first calculating the orthogonal coordinates of the four points P1 through P4 from the scanning angle according to the triangulation converting equations (1) and (2) and then calculating the average of the calculated coordinate values of the four points. Moreover, it is also possible to determine the coordinate of the central point Pc as the indicated position by considering parallax and easy viewing of the indicated position.

Figure 36:
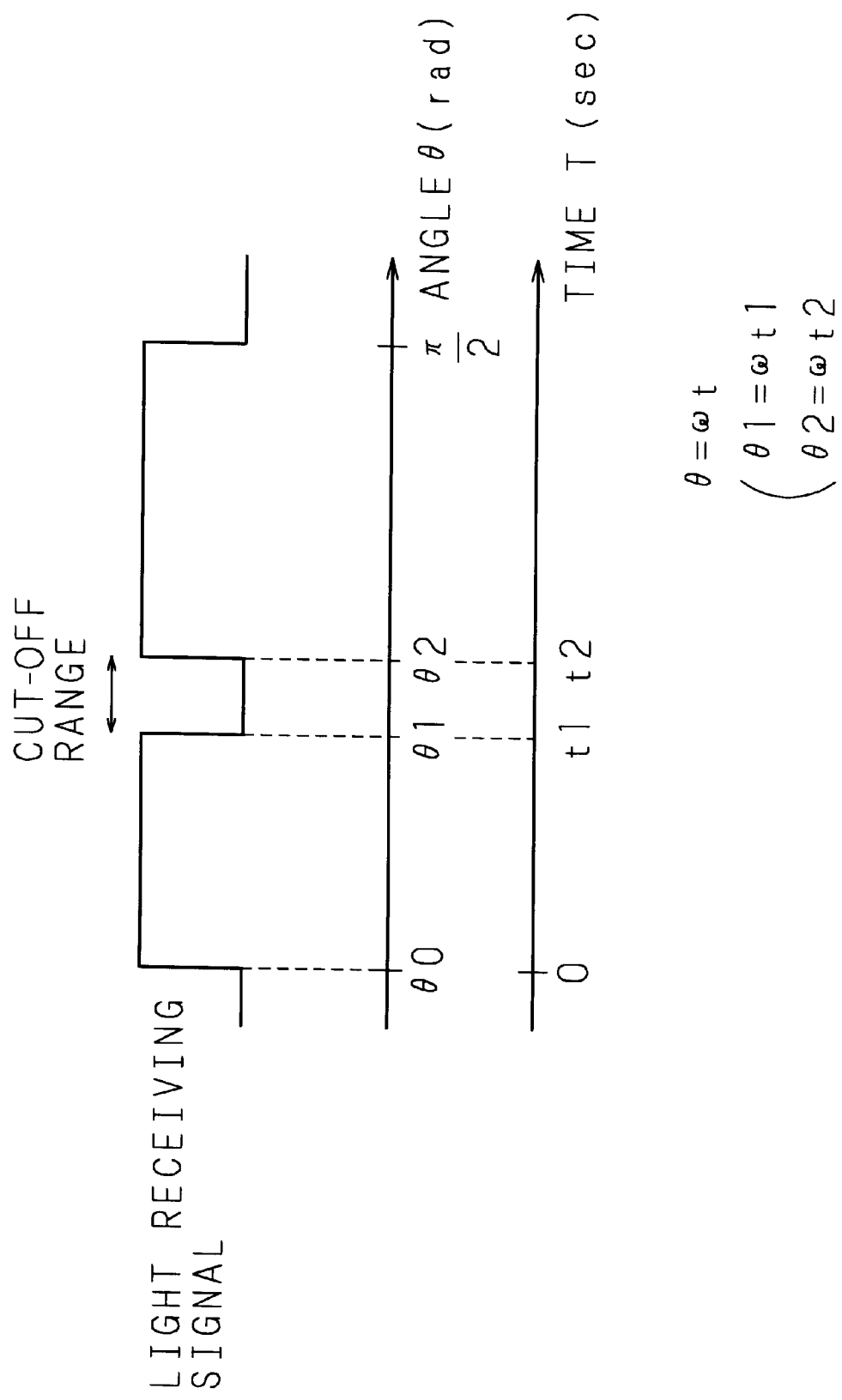
FIG. 36 is a timing chart showing the relationship between the light receiving signal, scanning angle and scanning time.

By the way, as mentioned above, since the angular velocity of the rotation of the respective polygon mirrors 15 is constant, the information about the scanning angle is obtainable by measuring the time. FIG. 36 is a timing chart showing the relationship between the light receiving signal from the light receiving signal detector 3a and the scanning angle $\theta$ and scanning time T of the polygon mirror 15 in the optical unit 1a. When the scanning angular velocity of the polygon mirror 15 is constant, if the scanning angular velocity is represented by $\omega$, a proportional relationship as shown by equation (5) below is established between the scanning angle $\theta$ and the scanning time T.

$$\theta=\omega\times T \quad (5)$$

Therefore, the angles $\theta 1$ and $\theta 2$ at the time of the fall and rise of the light receiving signal establish the relationships shown by equations (6) and (7) below with the scanning time t1 and t2.

$$\theta 1=\omega\times t1 \quad (6)$$

$$\theta 2=\omega\times t2 \quad (7)$$

Thus, when the scanning angular velocity of the polygon mirrors 16a and 16b is constant, it is possible to measure the cut-off range and coordinate position of the indicator S (finger) by using the time information.

Figure 37:
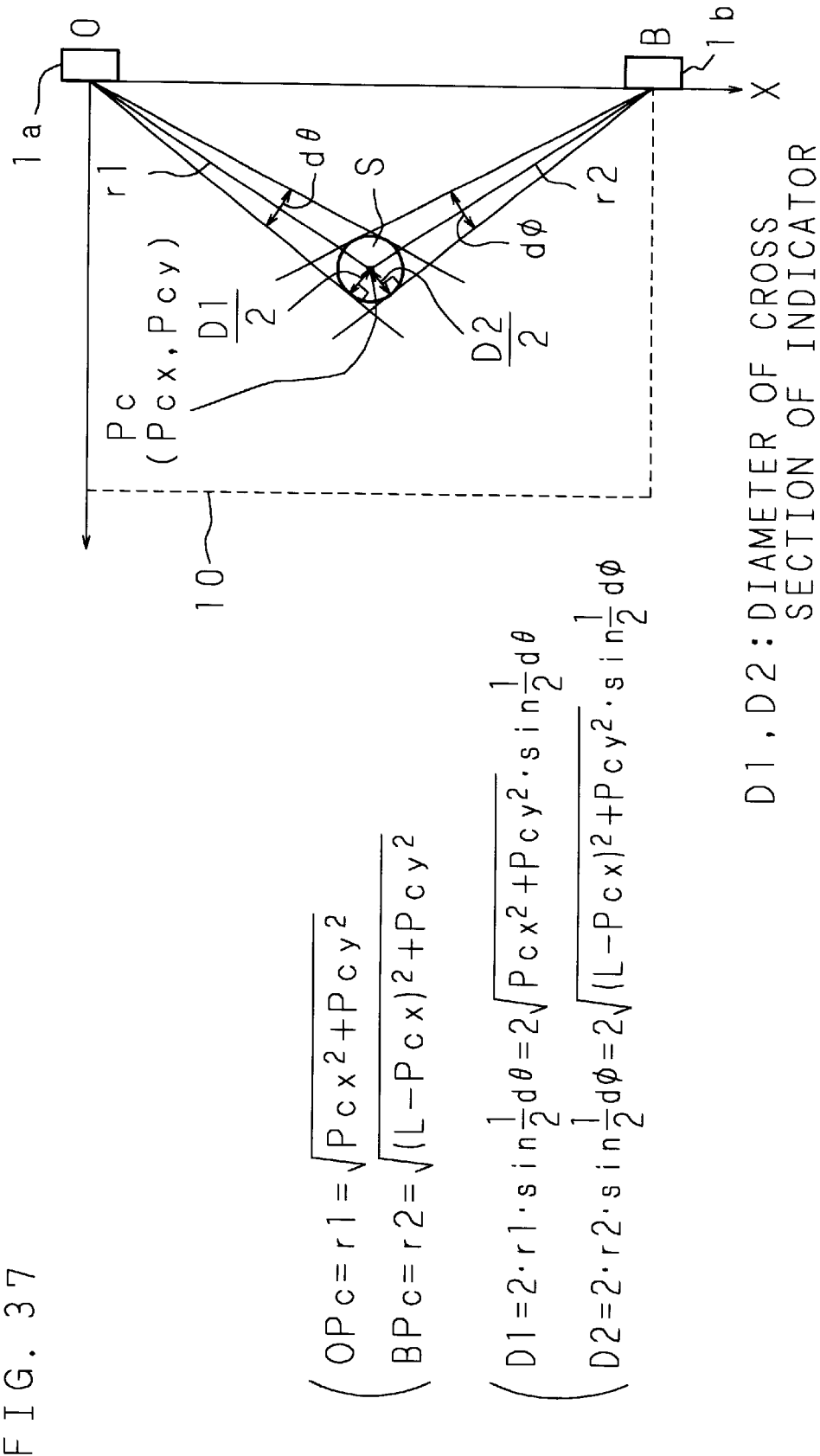
FIG. 37 is a schematic diagram showing the principle of measurement of the diameter of a cross-section of the indicator.

Moreover, in the optical scanning-type touch panel of the present invention, it is possible to calculate the size (the diameter of the cross section) of the indicator S (finger) from the measured cut-off range. FIG. 37 is a schematic diagram showing the principle of measuring the diameter of the cross section of the indicator S. In FIG. 37, D1 and D2 represent diameters of cross sections of the indicator S seen from the optical units 1a and 1b, respectively. First, distances OPc (r1) and BPc (r2) from the positions O (0, 0) and B (L, 0) of the optical units 1a and 1b to the central point Pc (Pcx, Pcy) of the indicator S are calculated as shown by equations (8) and (9) below.

$$OPc=r1=(Pcx^2+Pcy^2)^{1/2} \quad (8)$$

$$BPc=r2=\{(L-Pcx)^2+Pcy^2\}^{1/2} \quad (9)$$

Since the radius of the cross section of the indicator S can be approximated by the product of the distance to the central point and sine of a half of the cut-off angle, the diameters D1 and D2 of the cross sections are measurable according to equations (10) and (11) below.

$$D1=2\cdot r1\cdot\sin(d\theta/2)=2(Pcx^2+Pcy^2)^{1/2}\cdot\sin(d\theta/2) \quad (10)$$

$$D2=2\cdot r2\cdot\sin(d\phi/2)=2\{(L-Pcx)^2+Pcy^2\}^{1/2}\cdot\sin(d\phi/2) \quad (11)$$

Further, when $d\theta/2$, $d\phi/2\approx 0$, it is possible to approximate $\sin(d\theta/2)\approx d\theta/2\approx\tan(d\theta/2)$ and $\sin(d\phi/2)\approx d\phi/2\tan(d\phi/2)$, and therefore $d\theta/2$ or $\tan(d\theta/2)$, or $d\phi/2$ or $\tan(d\phi/2)$ may be substituted for $\sin(d\theta/2)$ and $\sin(d\phi/2)$ in equations (10) and (11).

INDUSTRIAL APPLICABILITY

As described above, in the optical scanning-type touch panel of the present invention, since the optical transceiver and the optical scanner are provided in a single base body as one unit, it is possible to readily perform the optical axis adjustment and positional adjustment of the respective optical members with high accuracy. As a result, highly accurate detection of the position and size of the indicator can be carried out.

What is claimed is:

1. An optical scanning-type touch panel comprising: an optical scanner for angularly scanning light in a plane substantially parallel to a predetermined region; and an optical transceiver for projecting light onto said optical scanner and receiving part of scanning light of said optical scanner; for measuring a scanning light cut-off position, which is produced in said predetermined region by an indicator, based on a light receiving output of said optical transceiver that corresponds to a scanning angle, said optical scanning-type touch panel being characterized in that said optical scanner comprises a polygon mirror and a motor for rotating said polygon mirror, said optical transceiver comprises a light emitting element, a collimation lens for changing light from said light emitting element into parallel light, a light receiving element for receiving part of said scanning light, an aperture mirror for limiting the parallel light from said collimation lens and reflecting part of said scanning light toward said light receiving element, a light receiving lens for focusing reflected light from said aperture mirror on said light receiving element, and a slit plate for limiting focused light from said light receiving lens, and said polygon mirror, motor, light emitting element, collimation lens, light receiving element, aperture mirror, light receiving lens and slit plate are mounted on a single base body as one unit.

2. An optical scanning-type touch panel comprising: an optical scanner for angularly scanning light in a plane substantially parallel to a predetermined region; and an optical transceiver for projecting light onto said optical scanner and receiving part of scanning light of said optical scanner; for measuring a scanning light cut-off position, which is produced in said predetermined region by an indicator, based on a light receiving output of said optical transceiver that corresponds to a scanning angle, said optical scanning-type touch panel being characterized in that said optical scanner and said optical transceiver are mounted on a single base body as one unit, and a polygon mirror and a motor constituting said optical scanner are fixed with a single mounting member by interposing a movement adjusting ring and a polygon mirror pressing member between said polygon mirror and motor.

3. The optical scanning-type touch panel as set forth in claim 2, wherein inside of said polygon mirror has a spot-facing structure.

4. The optical scanning-type touch panel as set forth in claim 3,
wherein an outside diameter of said polygon mirror pressing member is smaller than a diameter of an inscribed circle of said polygon mirror.

5. The optical scanning-type touch panel as set forth in claim 2,
wherein an upper portion and/or lower portion of both ends of said polygon mirror are chamfered.

6. The optical scanning-type touch panel as set forth in claim 2,
wherein said polygon mirror is made of nickel or stainless steel.

7. The optical scanning-type touch panel as set forth in claim 6,
wherein an aluminum film and an $SiO_2$ film are provided on a surface of said polygon mirror.

8. The optical scanning-type touch panel as set forth in claim 2,
wherein a groove is formed at a motor shaft peripheral section of a bearing surface for mounting said polygon mirror and motor.

9. The optical scanning-type touch panel as set forth in claim 8;
wherein said groove formed at the motor shaft peripheral section of the bearing surface for mounting said polygon mirror and motor has a depth of no less than 0.2 mm and a width of no less than 0.5 mm.

10. An optical scanning-type touch panel comprising: an optical scanner for angularly scanning light in a plane substantially parallel to a predetermined region; and an optical transceiver for projecting light onto said optical scanner and receiving part of scanning light of said optical scanner; for measuring a scanning light cut-off position, which is produced in said predetermined region by an indicator, based on a light receiving output of said optical transceiver that corresponds to a scanning angle, said optical scanning-type touch panel being characterized in that
said optical scanner and said optical transceiver are mounted on a single base body as one unit,
said optical transceiver comprises a light emitting element, a collimation lens for changing light from said light emitting element into parallel light and a lens holder for fixing said collimation lens, said lens holder having a groove running in a direction perpendicular to an optical axis, and
a collimate adjustment is performed by inserting a deflecting jig into said groove from a direction perpendicular to the optical axis and moving said lens holder in a direction parallel to the optical axis to make a fine adjustment to a distance between said light emitting element and said collimation lens.

11. The optical scanning-type touch panel as set forth in claim 10,
wherein, after the collimate adjustment, said lens holder is pressed by a plate spring from a direction which is perpendicular to the optical axis and also perpendicular to the deflecting jig,
and further said plate spring is fixed with a detachable mounting member.

12. The optical scanning-type touch panel as set forth in claim 10,
wherein, after the collimate adjustment, said lens holder is pressed by a plate spring from a direction which is perpendicular to the optical axis and parallel to the deflecting jig, and further said plate spring is fixed with a detachable mounting member.

13. The optical scanning-type touch panel as set forth in claim 10,
wherein a section of said plate spring for fixing said lens holder, which comes into contact with said lens holder, is made wider in a concave shape.

14. The optical scanning-type touch panel as set forth in claim 10,
wherein a width of said plate spring for fixing said lens holder is larger than a width of said lens holder.

15. The optical scanning-type touch panel as set forth in claim 10,
wherein a washer having a diameter larger than a diameter of said mounting member is interposed between said plate spring for fixing said lens holder and said mounting member.

16. The optical scanning-type touch panel as set forth in claim 10,
wherein a section of said plate spring for fixing said lens holder, which comes into contact with said lens holder, is made wider in a cross shape, and an end portion of the cross-shaped section is curved.

17. The optical scanning-type touch panel as set forth in claim 10,
wherein, when fixing said plate spring for fixing said lens holder, a fix portion of said plate spring, which is located distant from said lens holder, is fixed first, and a fix portion located close to said lens holder is fixed after the collimate adjustment.

18. The optical scanning-type touch panel as set forth in claim 10,
wherein, a ratio of distances from said lens holder to two fix portions of said plate spring for fixing said lens holder is not more than 1:3.

19. An optical scanning-type touch panel comprising: an optical scanner for angularly scanning light in a plane substantially parallel to a predetermined region; and an optical transceiver for projecting light onto said optical scanner and receiving part of scanning light of said optical scanner; for measuring a scanning light cut-off position, which is produced in said predetermined region by an indicator, based on a light receiving output of said optical transceiver that corresponds to a scanning angle, said optical scanning-type touch panel being characterized in that
said optical scanner and said optical transceiver are mounted on a single base body as one unit, and
said optical transceiver comprises a light emitting element, a collimation lens for changing light from said light emitting element into parallel light, and an aperture for limiting a size of light from said collimation lens, said aperture being formed in two or more stages.

20. The optical scanning-type touch panel as set forth in claim 19,
wherein an inner surface of said aperture does not have a mirror finish.

21. The optical scanning-type touch panel as set forth in claim 19,
wherein said aperture has an elliptical shape or a circular shape.

22. The optical scanning-type touch panel as set forth in claim 19,
wherein a section of said base body, which comes into contact with said aperture, has a reduced thickness.

23. The optical scanning-type touch panel as set forth in claim 22, wherein the section of said base body, which comes into contact with said aperture, has a thickness of no more than 1 mm.

24. The optical scanning-type touch panel as set forth in claim 19, wherein a size of an opening of said base body at a section to be in contact with said aperture is larger than a size of an exit of said aperture, but is smaller than a size of an entrance of said aperture.

25. The optical scanning-type touch panel as set forth in claim 19, wherein said optical transceiver further comprises a light receiving element for receiving part of scanning light and an aperture mirror constructed by forming a mirror for guiding part of scanning light to said light receiving element and said aperture as one body.

26. The optical scanning-type touch panel as set forth in claim 25, wherein said aperture mirror includes a pasted mirror.

27. The optical scanning-type touch panel as set forth in claim 25, wherein positioning of said base body and said aperture mirror is implemented by a move-and-touch structure.

28. The optical scanning-type touch panel as set forth in claim 27, wherein a touched section between said base body and said aperture mirror is provided with a clearance hole.

29. The optical scanning-type touch panel as set forth in claim 25, wherein said aperture mirror is fixed to said base body with a detachable mounting member.

30. An optical scanning-type touch panel comprising: an optical scanner for angularly scanning light in a plane substantially parallel to a predetermined region; and an optical transceiver for projecting light onto said optical scanner and receiving part of scanning light of said optical scanner; for measuring a scanning light cut-off position, which is produced in said predetermined region by an indicator, based on a light receiving output of said optical transceiver that corresponds to a scanning angle, said optical scanning-type touch panel being characterized in that said optical scanner and said optical transceiver are mounted on a single base body as one unit, said optical transceiver comprises a light receiving element for receiving part of scanning light, a light receiving lens for focusing light on said light receiving element, and a lens holder for fixing said light receiving lens, said lens holder having a groove running in a direction perpendicular to an optical axis, and a fine adjustment is made to a distance between said light receiving element and said light receiving lens by inserting a deflecting jig into said groove from a direction perpendicular to the optical axis and moving said lens holder in a direction parallel to the optical axis.

31. The optical scanning-type touch panel as set forth in claim 30, wherein said optical transceiver further comprises a slit plate having a slit for limiting light from said light receiving lens, said slit plate being mounted on said base body so that said slit plate is movable in a direction of a minor axis of said slit.

32. The optical scanning-type touch panel as set forth in claim 30, wherein said optical transceiver further comprises a slit plate having a slit for limiting light from said light receiving lens, said slit plate being inserted into a groove-like holding section of said base body so that said slit plate is movable in a direction of a minor axis of said slit.

33. The optical scanning-type touch panel as set forth in claim 30, wherein said optical transceiver further comprises a slit plate having a slit for limiting light from said light receiving lens, said slit plate being held on said base body by a one-side move-and-touch structure so that said slit plate is movable in a direction of a minor axis of said slit.

* * * * *